(12) United States Patent
Hagiwara et al.

(10) Patent No.: US 11,859,405 B2
(45) Date of Patent: Jan. 2, 2024

(54) HANDLE ATTACHMENT AND LAVATORY DOOR

(71) Applicant: JAMCO CORPORATION, Tokyo (JP)

(72) Inventors: Hisaya Hagiwara, Tokyo (JP); Sachiko Fukutomi, Tokyo (JP)

(73) Assignee: JAMCO CORPORATION, Tokyo (JP)

( * ) Notice: Subject to any disclaimer, the term of this patent is extended or adjusted under 35 U.S.C. 154(b) by 183 days.

(21) Appl. No.: 17/606,067

(22) PCT Filed: Mar. 15, 2021

(86) PCT No.: PCT/JP2021/010331
§ 371 (c)(1),
(2) Date: Oct. 25, 2021

(87) PCT Pub. No.: WO2021/246017
PCT Pub. Date: Dec. 9, 2021

(65) Prior Publication Data
US 2022/0307286 A1   Sep. 29, 2022

(30) Foreign Application Priority Data
Jun. 1, 2020   (JP) ................................ 2020-095239

(51) Int. Cl.
*E05B 1/00* (2006.01)
*B64C 1/14* (2006.01)

(52) U.S. Cl.
CPC .......... *E05B 1/0053* (2013.01); *B64C 1/1407* (2013.01)

(58) Field of Classification Search
CPC ........ E05B 1/0053; E05B 65/48; E05B 85/14; E05B 85/18; E05B 63/20; E05B 85/103;
(Continued)

(56) References Cited

U.S. PATENT DOCUMENTS

| 919,750 | A | * | 4/1909 | Neumeister | ......... E05B 65/0864 |
| | | | | | 292/DIG. 20 |
| 2,029,199 | A | * | 1/1936 | Segar | .................... E05B 85/107 |
| | | | | | 292/164 |

(Continued)

FOREIGN PATENT DOCUMENTS

| EP | 3498940 A1 | 6/2019 |
| JP | 51131037 U | 10/1976 |

(Continued)

OTHER PUBLICATIONS

International Search Report for corresponding Application No. PCT/JP2021/010331, dated Jun. 1, 2021.

(Continued)

*Primary Examiner* — Christine M Mills
*Assistant Examiner* — Faria F Ahmad
(74) *Attorney, Agent, or Firm* — Renner, Otto, Boisselle & Sklar, LLP

(57) ABSTRACT

The handle attachment includes a base portion that can be attached to a portion of a wall surface of a door, a flap portion that applies, as a result of a pulling operation, a pulling force to the door via the base portion, a flap rotation mechanism that rotatably connects the flap portion with respect to the base portion around a rotation axis, and a biasing member that biases the flap portion in a first rotation direction around the rotation axis with respect to the base portion. The flap portion includes a base end portion connected to the flap rotation mechanism and a distal end portion arranged at a position away from the flap rotation mechanism. The first rotation direction is a direction in which the distal end portion of the flap portion separates from the wall surface of the door.

12 Claims, 21 Drawing Sheets

(58) Field of Classification Search
CPC ... E05B 85/107; B64C 1/1407; E05C 19/145; E05C 1/04; E05C 19/184; E05C 1/145
See application file for complete search history.

(56) References Cited

U.S. PATENT DOCUMENTS

| | | | | |
|---|---|---|---|---|
| 2,587,695 A * | | 3/1952 | Citso | E05F 11/00 292/153 |
| 3,214,207 A * | | 10/1965 | Oscar | E05C 19/145 292/DIG. 31 |
| D242,662 S * | | 12/1976 | Darrell | D20/33 |
| 4,006,927 A * | | 2/1977 | Recupero | E05B 1/0053 292/336.3 |
| D248,425 S * | | 7/1978 | Darrell | D8/404 |
| 5,127,686 A * | | 7/1992 | Gleason | E05B 85/243 292/216 |
| 5,234,238 A * | | 8/1993 | Takimoto | E05B 5/00 292/216 |
| 5,413,391 A * | | 5/1995 | Clavin | E05C 1/145 292/DIG. 31 |
| 5,461,892 A * | | 10/1995 | Hsieh | E05C 19/145 70/69 |
| 5,603,535 A * | | 2/1997 | Antonucci | E05B 65/0835 292/228 |
| 5,630,630 A * | | 5/1997 | Price | E05B 83/30 292/336.3 |
| 5,689,980 A * | | 11/1997 | Weinerman | E05C 1/14 292/DIG. 31 |
| 5,820,175 A * | | 10/1998 | Clavin | E05C 1/145 292/DIG. 31 |
| 5,975,556 A * | | 11/1999 | Lehmann | A63C 10/145 280/14.22 |
| 6,109,669 A * | | 8/2000 | Pinkow | E05C 1/145 292/DIG. 31 |
| 6,152,501 A * | | 11/2000 | Magi | E05B 5/00 292/DIG. 31 |
| 6,719,332 B2 * | | 4/2004 | Sekulovic | E05C 3/162 292/DIG. 31 |
| 7,118,142 B2 * | | 10/2006 | Xu | E05B 41/00 292/DIG. 31 |
| 7,182,374 B2 * | | 2/2007 | Figge | E05B 63/20 292/334 |
| 7,204,528 B2 * | | 4/2007 | Vitry | B60R 5/04 292/DIG. 31 |
| 7,399,009 B2 | | 7/2008 | Hall et al. | |
| 7,568,739 B2 * | | 8/2009 | Lee | B25H 3/02 292/85 |
| 7,611,173 B2 * | | 11/2009 | Helton | E05B 13/002 292/216 |
| 7,823,937 B2 * | | 11/2010 | Vitry | E05B 77/36 292/336.3 |
| D654,956 S * | | 2/2012 | Cook | D20/31 |
| 8,720,116 B1 * | | 5/2014 | Ahmad | E05B 1/0053 16/431 |
| 8,783,739 B2 * | | 7/2014 | Hasegawa | E05B 83/32 292/220 |
| 9,169,675 B2 * | | 10/2015 | Voigt | E05B 77/04 |
| 10,253,530 B2 * | | 4/2019 | Savant | E05B 85/14 |
| 11,306,520 B2 * | | 4/2022 | Jung | E05B 83/28 |
| D995,630 S * | | 8/2023 | Butler | D20/11 |
| 2005/0121924 A1 * | | 6/2005 | Chanya | E05B 85/107 292/336.3 |
| 2006/0038418 A1 * | | 2/2006 | Huizenga | E05B 79/20 292/336.3 |
| 2006/0232079 A1 * | | 10/2006 | Hsieh | E05B 65/0035 292/336.3 |
| 2008/0018116 A1 * | | 1/2008 | Helton | E05B 13/002 292/173 |
| 2008/0157546 A1 * | | 7/2008 | Vitry | E05B 5/00 292/216 |
| 2012/0274457 A1 * | | 11/2012 | Burns | E05B 85/18 70/91 |
| 2013/0076046 A1 * | | 3/2013 | Shah | E05B 1/0053 292/336.3 |
| 2018/0223571 A1 * | | 8/2018 | Jean | E05B 5/003 |
| 2019/0145136 A1 * | | 5/2019 | Jung | E05B 83/18 292/336.3 |
| 2020/0173198 A1 * | | 6/2020 | Stenhouse | E05B 65/0858 |
| 2023/0250682 A1 * | | 8/2023 | Newell | E05C 19/145 292/259 A |

FOREIGN PATENT DOCUMENTS

| | | |
|---|---|---|
| JP | 5864806 B1 | 1/2016 |
| KR | 20100049791 A | 5/2010 |

OTHER PUBLICATIONS

Written Opinion for corresponding Application No. PCT/JP2021/010331, dated Jun. 1, 2021.

* cited by examiner (a)

(b)

(c)

HANDLE ATTACHMENT AND LAVATORY DOOR

TECHNICAL FIELD

The present invention relates to a handle attachment and lavatory door.

BACKGROUND OF THE INVENTION

Infectious diseases, such as coronavirus, often spread via door handles and handrails that are used by large numbers of unspecified people. For example, when an uninfected person touches a door handle or the like that was operated by an infected person who touched it directly with their hand or fingers, there is a high likelihood that the virus adheres to the hand or fingers of the non-infected person. When this uninfected person touches their own mouth, nose, eyes, or the like with their hands or fingers to which the virus has adhered, the virus may invade their body, and the uninfected person may suffer from the infectious disease.

Therefore, in order to prevent infectious diseases, it is effective to reduce the number of places that large numbers of unspecified people touch directly with their hands or fingers.

Accordingly, there is a technique disclosed in Patent Document 1 for equipment that a user can use without touching a door or the like when entering or exiting a lavatory. Patent Document 1 discloses, "a toilet unit comprising an airtight room with a doorway, a toilet booth installed in the airtight room, a door that opens and closes the doorway, a doorway opening/closing device that opens the door when a mat sensor installed on an entrance floor, an air curtain generation device that operates in conjunction with the opening of the door by the doorway opening/closing device and creates an air curtain by an airflow flowing downward from a top of the doorway, and a plasma generation device that mixes plasma into the airflow."

CITATION LIST

Patent Documents

[Patent Document 1] Japanese Patent No. 5,864,806 B

SUMMARY OF INVENTION

Technical Problem

However, the technique of Patent Document 1 requires construction of a floor surface or the like for installation of the equipment, such that the burden of installation is large. In addition, when installing on existing equipment, it is difficult to utilize existing equipment with mechanical door locks and the like, and full-scale renovation becomes necessary.

It is therefore an object of the present invention to enable a user to easily open a door without using their fingers or hands by attaching a handle attachment to existing equipment or newly installed equipment.

Means for Solving the Problems

In order to solve the above problems, a handle attachment according to embodiments includes a base portion that can be attached to a portion of a wall surface of a door; a flap portion that applies, as a result of a pulling operation, a pulling force to the door via the base portion; a flap rotation mechanism that rotatably connects the flap portion with respect to the base portion around a rotation axis; and a biasing member that biases the flap portion in a first rotation direction around the rotation axis with respect to the base portion. The flap portion includes a base end portion connected to the flap rotation mechanism and a distal end portion arranged at a position away from the flap rotation mechanism. The first rotation direction is a direction in which the distal end portion of the flap portion separates from the wall surface of the door.

In addition, a lavatory door according to embodiments includes the above-described handle attachment and a door panel attached to a first wall of a lavatory so as to be rotatable around a door hinge axis. The handle attachment is attached to the door panel.

Advantageous Effects of Invention

According to the present invention, it is possible to enable a user to easily open a door without using their fingers or hands by attaching a handle attachment to existing equipment or newly installed equipment.

Other problems, configurations and effects other than those described above will be made clear by the description of the following embodiments.

DESCRIPTION OF EMBODIMENT(S)

Figure 1:
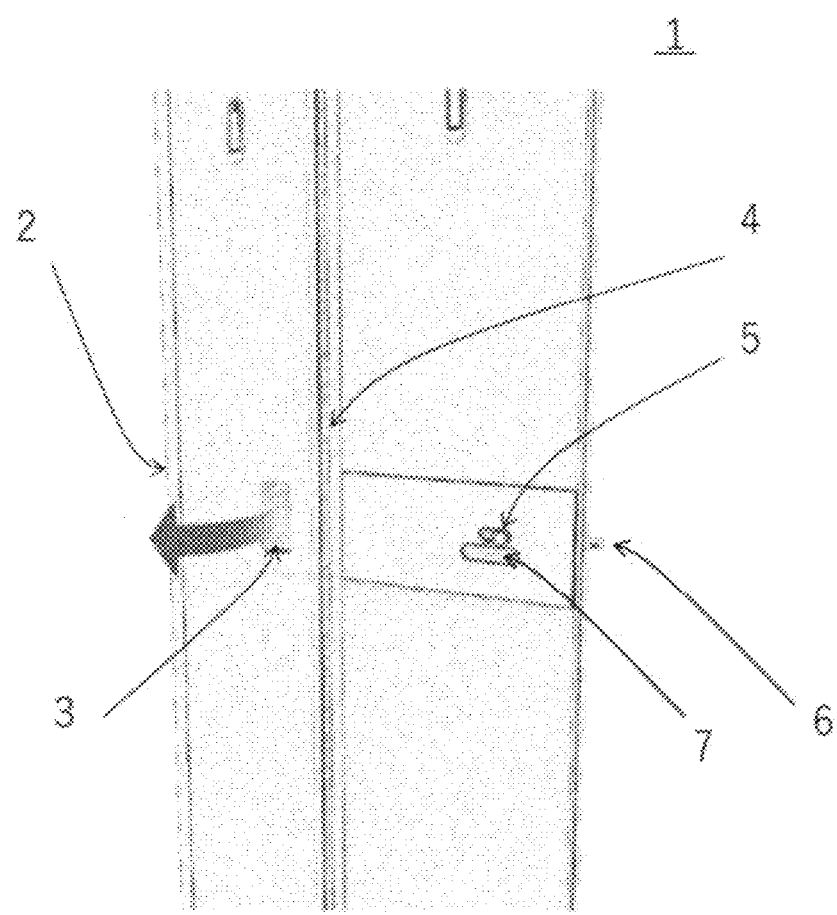
FIG. 1 is a view illustrating a conventional bifold door.

Hereinafter, a handle attachment and a lavatory door according to embodiments will be described with reference to the drawings. It should be noted that, in the following description of the embodiments, parts and members having the same functions are denoted by the same reference numerals, and redundant descriptions of parts and members denoted by the same reference numerals are omitted.

In the present disclosure, the "handle" is a member that applies a force with a hand or fingers to open or close a door, and is a member that can be provided in a space in which a part of the door is recessed, or provided so as to protrude from the door.

The "door hinge" refers to a member that is rotatably attached to the wall surface of an opening portion in which a door is installed. Also, the "door hinge axis" refers to the rotation axis of the door attached by the door hinge. The door hinge axis is substantially parallel to the vertical direction if the rotation axis of the door is vertical, but in cases in which the door is movable in the vertical direction, the door hinge axis may be substantially parallel to the horizontal direction.

Further, the "door" of the present disclosure is meant to include a door constructed of a panel including a single plane or a curved surface, a bifold door configured to fold midway along a second door hinge axis, or a door having a bellows-like extendable panel.

In addition, the "lock knob" refers to a protruding member (for example, a rod-shaped member) that protrudes from the door toward the room direction in order to lock or unlock the door, and the locking position and the unlocking position can be switched by moving the protruding member.

In the present disclosure, one direction parallel to the rotation axis AX of the flap portion 25 is defined as the first direction DR1, and the direction opposite to the first direction DR1 is defined as the second direction DR2.

Conventional Example

First, with reference to FIG. 1, a description will be given of an outline of a conventional door structure. FIG. 1 illustrates an example of a bifold door 1 having a center-folding structure for use in a lavatory of an aircraft or the like, as seen from the inside of the lavatory. The bifold door 1 is rotatably mounted to a wall (not illustrated in the figure) in an aircraft by a door hinge axis 2, and is designed so that it can be folded at a center-folding portion 4 (in other words, a second door hinge axis). When opening the bifold door 1 from the outside of the lavatory, the door can be opened simply by pushing it with the hand, arm, or elbow. However, in order to open the bifold door 1 from the inside of the lavatory, it is necessary to pull the handle portion 3 toward the user with the hand or fingers.

In addition, when locking the bifold door 1, it is necessary to slide the lock knob 5 in the lateral direction to reliably protrude the lock portion 6 to the wall member side of the aircraft. In addition, when unlocking the bifold door 1, on the contrary, it is necessary to slide the lock knob 5 in the lateral direction and reliably pull in the lock portion 6 from the wall member side of the aircraft.

It should be noted that when the lock knob 5 is operated in the lateral direction, the unlocked state and the locked state are displayed on the outer surface of the lavatory on the display unit 7.

Accordingly, when entering and leaving the room, it is necessary for the user to operate the handle portion 3 and the lock knob 5 by using their fingers and hands. In particular, however, since aircraft lavatories have hand-washing facilities within the lavatory, it is necessary for the user to touch the handle portion 3 and the lock knob 5 after washing their hands. As such, from the viewpoint of preventing infectious diseases, it is desirable to make it possible to open and close the door without using fingers or hands.

Handle Attachment 20 According to the First Embodiment

Figure 2:
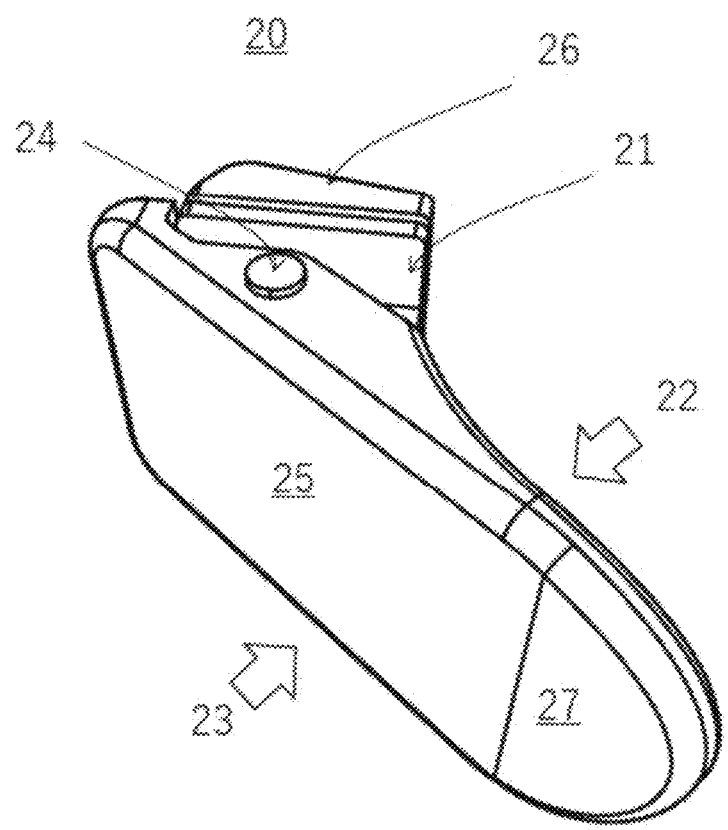
FIG. 2 is a schematic view of a handle attachment according to a first embodiment.

FIG. 2 is a schematic view of a handle attachment. The handle attachment 20 includes a base portion 21 and a flap portion 25 which serves as a first operation portion. The handle attachment 20 may include an auxiliary base portion 26 that can be coupled to the base portion 21 in order to sandwich the door between the base portion 21 and the auxiliary base portion 26. The base portion 21 is fixed to the wall surface of the door using a fixing member such as a screw. In addition, the flap portion 25 is rotatably attached to the base portion 21 via a flap rotation mechanism 24 such as a pin member.

The flap rotation mechanism 24 is provided on the door wall surface side 22 of the flap portion 25. In addition, the flap portion 25 has a horizontally long surface that is substantially perpendicular to the door hinge axis on the opposite side 23 of the door wall surface side.

Further, the flap portion 25 is biased against the base portion 21 using a member such as a spring so that the end portion 27 on the far side from the flap rotation mechanism 24 faces away from the wall surface of the door.

Operation of the Handle Attachment 20

Next, with reference to FIG. 3 and FIG. 4, the operation when the handle attachment 20 is installed on the bifold door 1 will be described.

Figure 3:
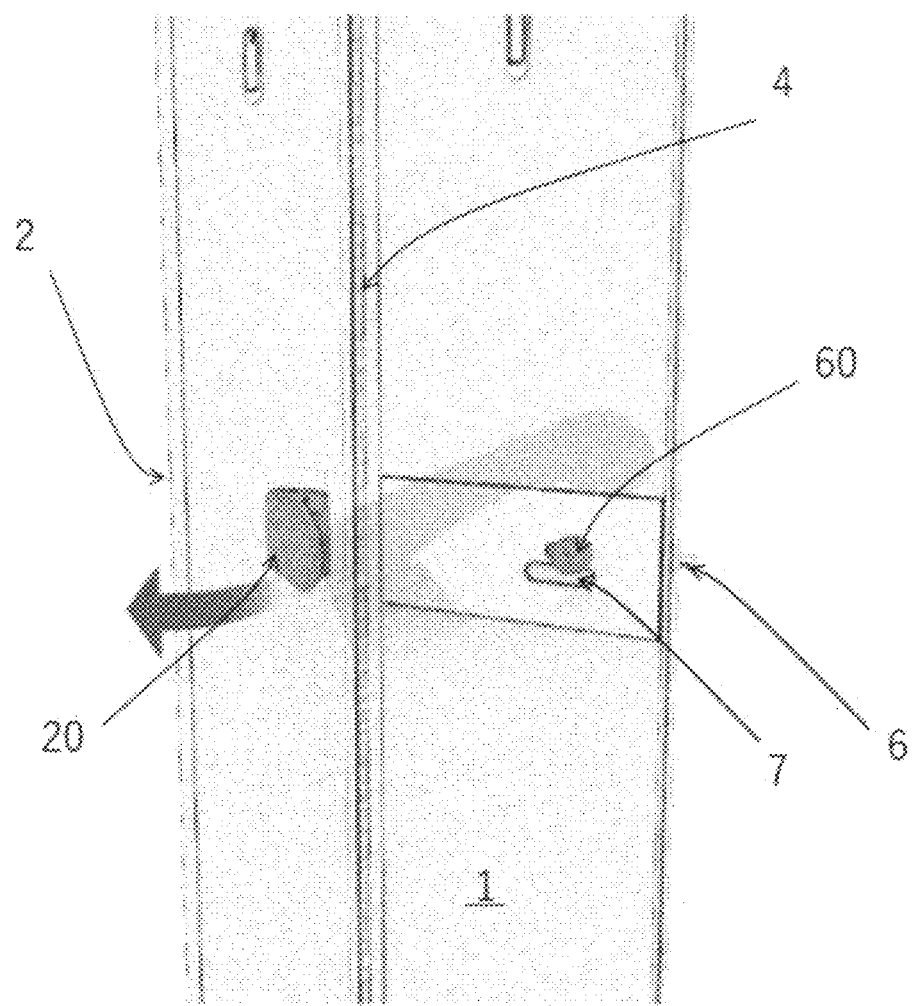
FIG. 3 is a diagram for explaining an operation using the handle attachment.

FIG. 3 illustrates a state in which the bifold door 1 to which the handle attachment 20 and the lock knob attachment 60 are attached is closed. In order to open the door from such a state, as depicted in the figure, an arm or elbow may be hung on the handle attachment 20 to push the bifold door 1 in the direction of the arrow in the figure, that is, in the direction of the door hinge axis 2.

Figure 4:
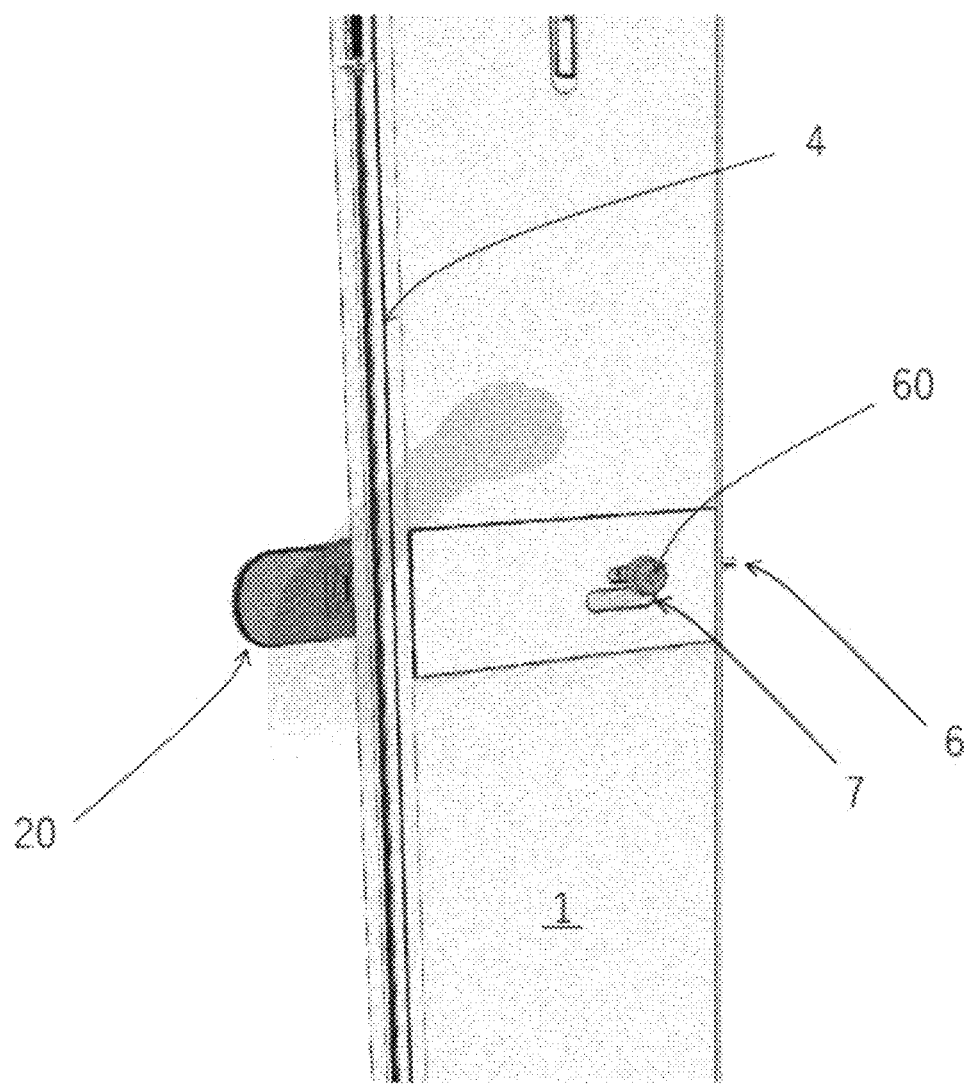
FIG. 4 is a diagram for explaining an operation using the handle attachment.

As illustrated in FIG. 4, by continuing to push the handle attachment 20 with an arm or elbow, the door 1 can be easily opened.

In the embodiment illustrated in FIG. 3 and FIG. 4, by attaching the handle attachment 20, the door 1 can be opened and closed without using fingers or hands. More particularly, the opening and closing operation of the door 1 can be performed with an elbow or an arm. In addition, even in a narrow space such as an aircraft lavatory, the handle attachment 20 can easily apply the force in the direction of the door hinge axis required for opening and closing the door 1 with a light force. Accordingly, it is possible to smoothly perform the opening and closing operation.

Handle Attachment 20 Installation Location and Attachment Method

It should be noted that, in the example of FIG. 3 and FIG. 4, although an example is described in which the handle attachment 20 is installed at the location of a handle portion installed on the door, the installation location of the handle attachment 20 is not limited to the location where the handle portion is installed.

The handle attachment 20 can also be placed low so as to be operated by a foot.

The attachment of the handle attachment 20 to the door 1 may be performed using embedded nuts and bolts. Alternatively, more simply, the handle attachment 20 may be fixed to an existing handle using rivets or adhesives.

In addition, the handle attachment 20 may also be attached to an existing handle without the use of a tool by using a tension rod or a mechanical lock that can be fitted to an existing handle.

Handle Attachment Details

Figure 5:
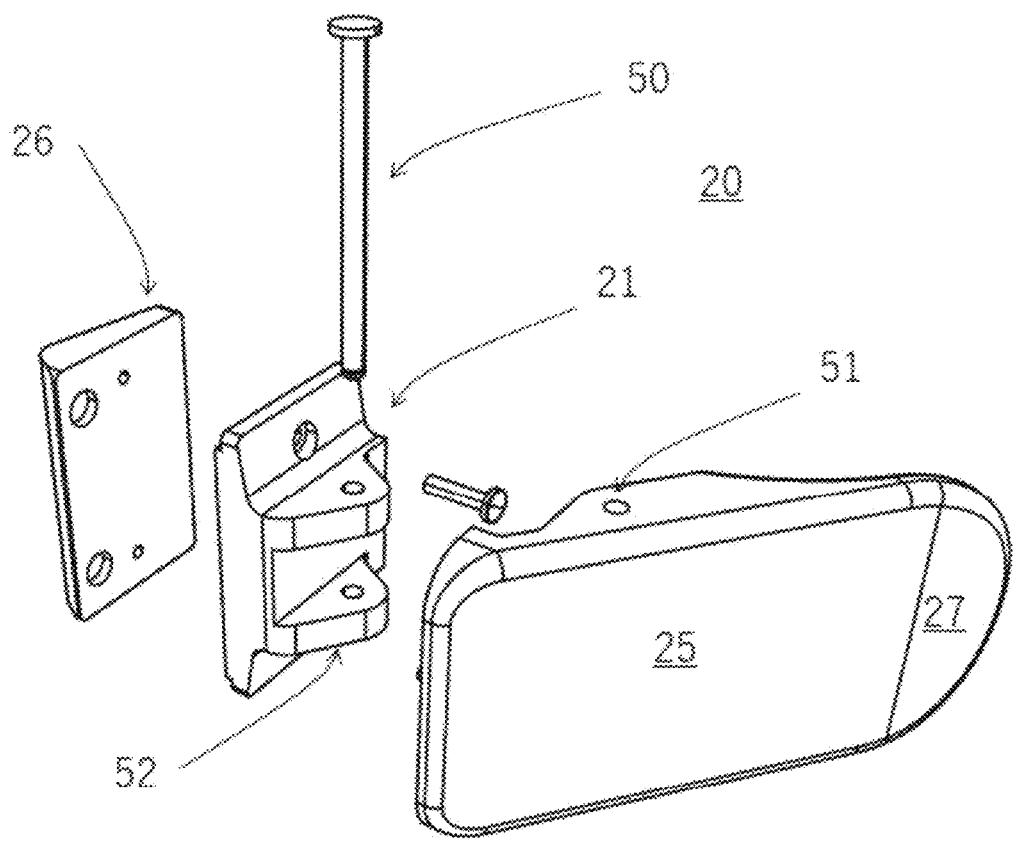
FIG. 5 is an exploded view of the handle attachment.

Next, the handle attachment 20 will be described with reference to the exploded view illustrated in FIG. 5. The base portion 21 and the flap portion 25 may be connected to each other by, for example, inserting a pin member 50 into a pin receiving portion 52 of the base portion 21 and a pin receiving portion 51 of the flap portion 25. In this case, the flap rotation mechanism 24 is constituted by the pin member 50. Then, by installing a spring mechanism (not shown in the figure) between the base portion 21 and the flap portion 25, the end portion 27 is maintained in a suspended state (a leaping state) from the wall surface of the door 1. In this way, operations with elbows and arms can be performed more easily.

Figure 6:
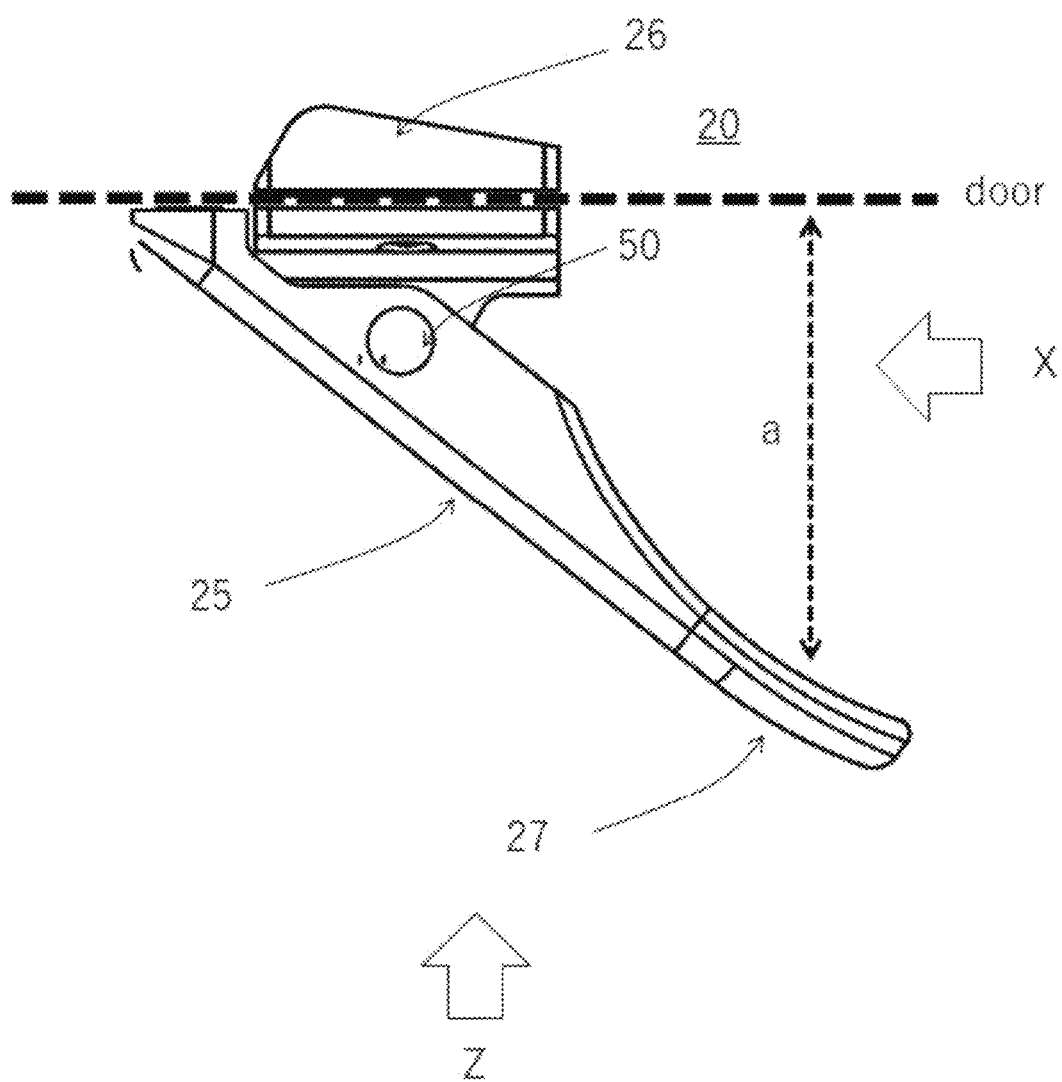
FIG. 6 is a top view of the handle attachment.

FIG. 6 is a top view of the handle attachment 20, and as shown by the distance a, it can be seen that the end portion 27 is greatly elevated with respect to the wall surface of the door 1 indicated by the thick dashed line.

Figure 7:
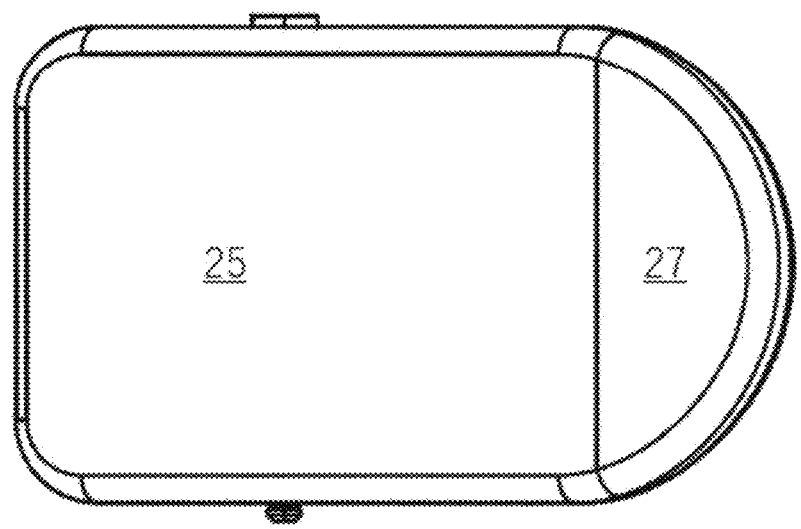
FIG. 7 is a front view of the handle attachment.
Figure 8:
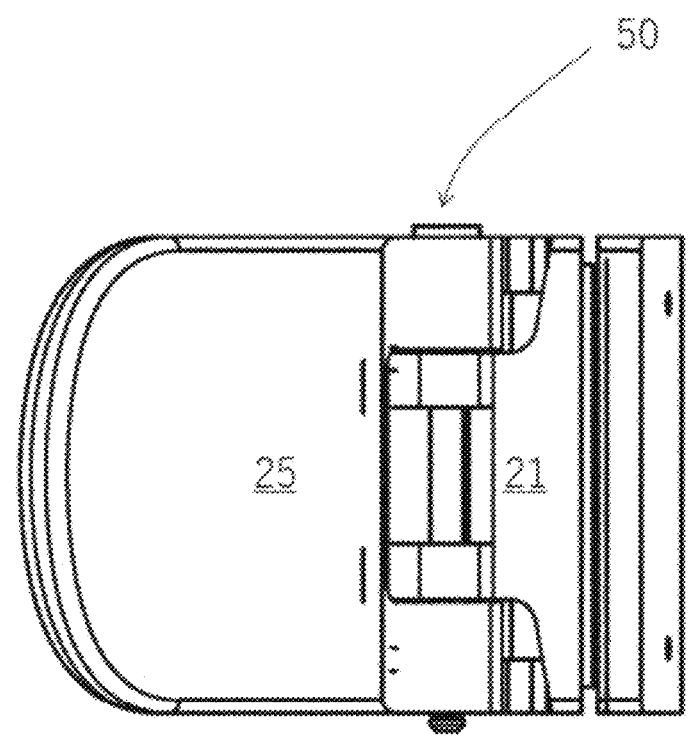
FIG. 8 is a side view of the handle attachment.

FIG. 7 is a front view seen from the Z direction of FIG. 6, and FIG. 8 is a side view seen from the X direction of FIG. 6.

Figure 9:
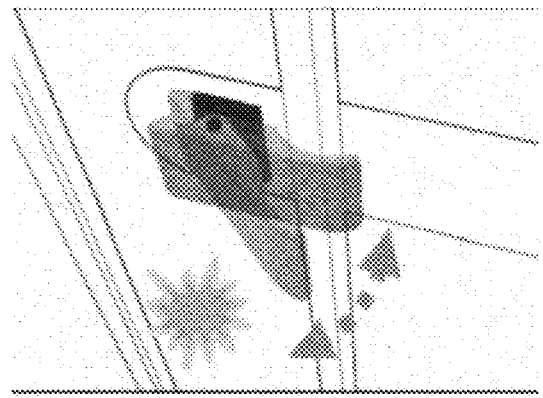
FIG. 9 is a view for explaining the contact between the handle attachment and the wall.
Figure 9:
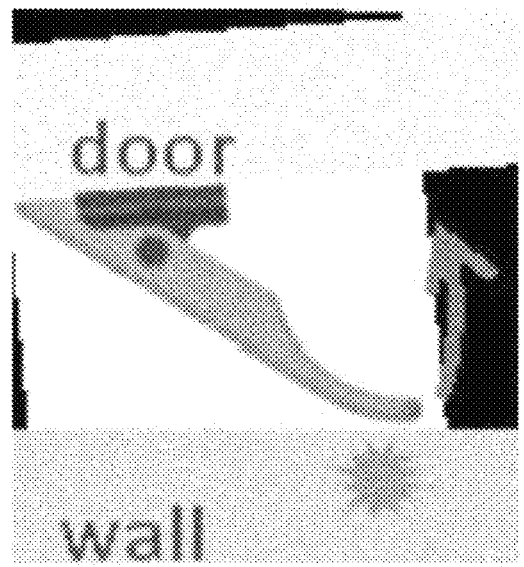
Figure 9:
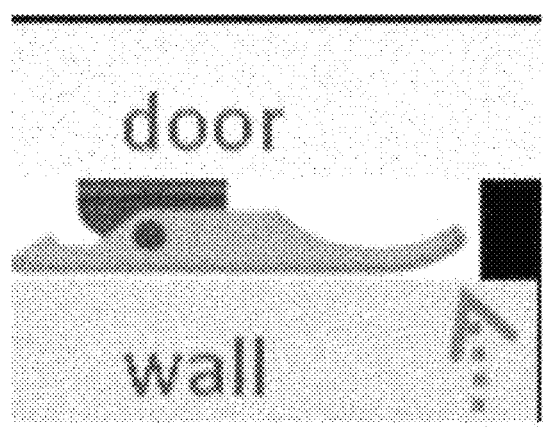

When the bifold door 1 is used in a narrow space such as an aircraft lavatory, the clearance between the door and the wall (or the plastic mirror on the wall surface) when the lavatory door is fully opened is usually very small, about 30 mm. Accordingly, when the door 1 is opened, the handle attachment may come into contact with the wall surface (or the plastic mirror on the wall surface) and damage the contacted object (see FIG. 9A and FIG. 9B).

Therefore, a spring material is built in the handle attachment 20, and normally, the end portion 27 of the flap portion 25 is biased to the side where the door opens so as to be in a suspended state (a leaping state) from the door surface. In this state, users can easily recognize the handle attachment 20, and easily perform an operation of hanging their arm or elbow on the handle attachment (see FIG. 3)

In addition, interference between the door and the wall surface when the door is fully opened is prevented as much as possible by moving the flap portion 25 of the handle attachment 20 toward the base portion 21 against the biasing force of the spring material built in the handle attachment 20 (see FIG. 9C).

By means of such a structure of the handle attachment 20, by having the handle attachment 20 fold when a body hits it in a narrow lavatory, it is also possible to prevent injury when a user interferes with the handle attachment.

Further, depending on the type of lavatory, there are cases in which the clearance between the door and the wall (or the plastic mirror on the wall surface) may be 10 mm or less when the door is fully opened.

In such cases, it is also possible to prevent interference by embedding the handle attachment 20 in the thickness direction of the door plate.

In addition, the end portion 27 of the flap portion may have a hook-like structure that curves toward the wall side of the door, as illustrated in FIG. 9B and FIG. 9C. With such a shape, it is possible to prevent arms or elbows from being inadvertently caught in the door 1.

It should be noted that, in the above embodiment, an example of applying the handle attachment 20 to a door that opens and closes in the horizontal direction has been described, but the handle attachment 20 according to embodiments may be applied to a door of an aircraft baggage storage space that opens and closes in the vertical direction. In addition, the handle attachment 20 may be applied to a door in a facility such as an aircraft galley.

Lock Knob Attachment 60 According to the First Embodiment

Figure 10:
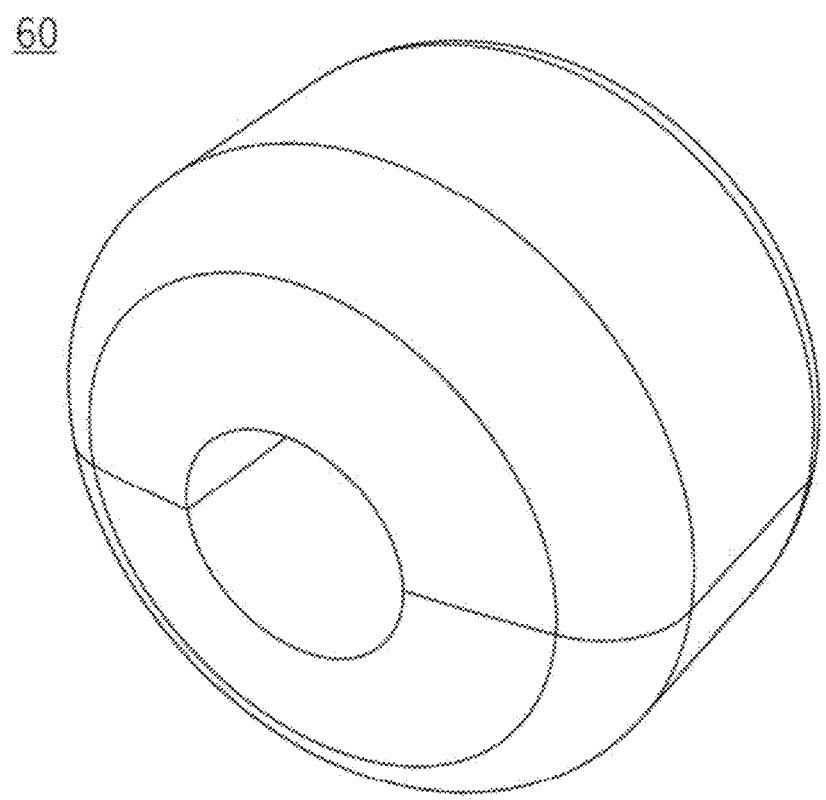
FIG. 10 is a perspective view of a lock knob attachment according to the first embodiment.
Figure 11:
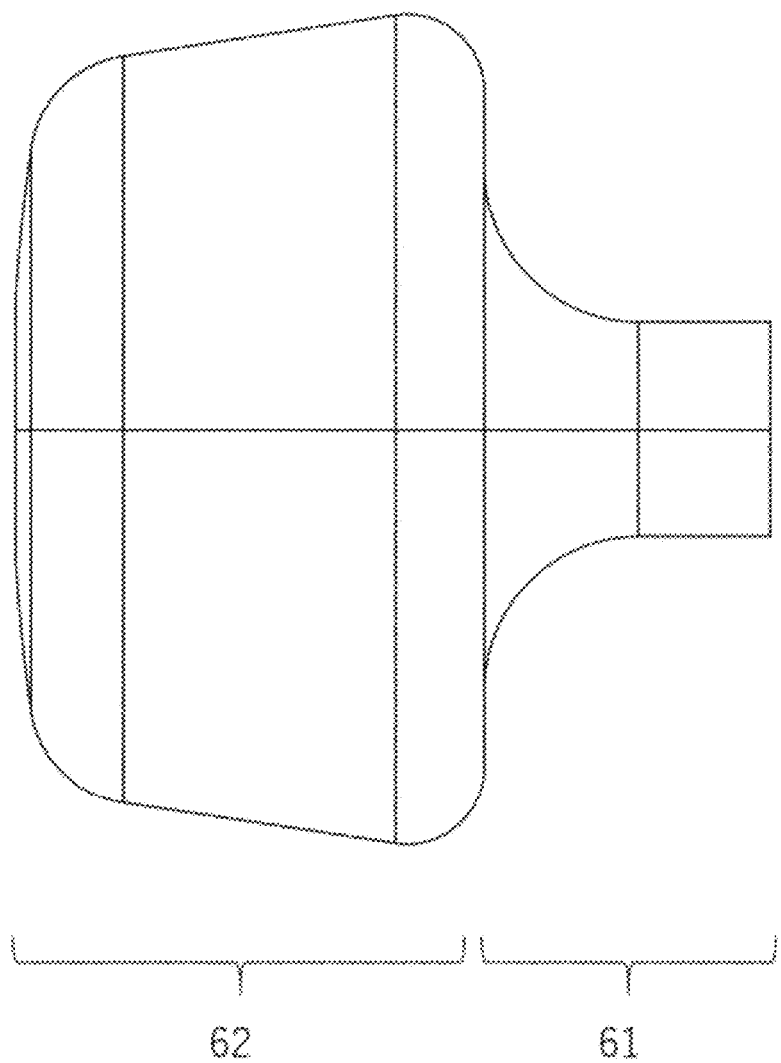
FIG. 11 is a side view of the lock knob attachment according to the first embodiment.

FIG. 10 is a perspective view of a lock knob attachment 60, and FIG. 11 is a side view of the lock knob attachment 60. The lock knob attachment 60 is an attachment that can be attached to the lock knob 5. As illustrated in FIG. 10 and FIG. 11, the lock knob attachment 60 includes an attachment portion 61 that has a cavity that is capable of engaging with the lock knob 5, and a main body portion 62 that has a larger outer diameter than the attachment portion that protrudes from the attachment portion 61 in the normal direction of the door surface (see FIG. 11).

Operation of the Lock Knob Attachment

Next, with reference to FIG. 12, an operation when the lock knob attachment 60 is installed on the bifold door 1 will be described.

Figure 12:
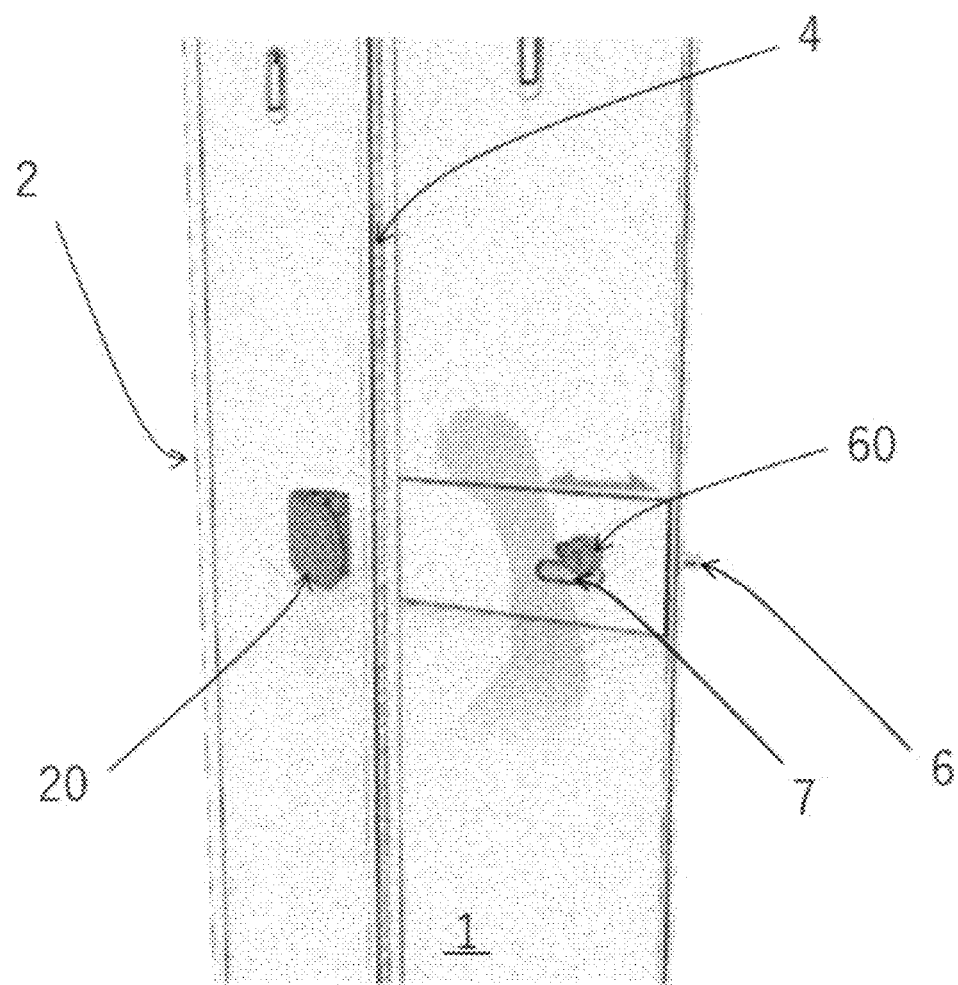
FIG. 12 is a diagram for explaining an operation using the lock knob attachment.

FIG. 12 illustrates a state in which the bifold door 1 to which the handle attachment 20 and the lock knob attachment 50 are attached is closed. In order to unlock or lock the door from such a state, as depicted in the figure, an arm or elbow may be hung on the lock knob attachment 60, and the lock knob attachment 60 may be laterally moved in the direction of the arrow in the figure, that is, a direction away from the door hinge axis 2 or in a direction that approaches the door hinge axis 2.

In the lock knob attachment 60 according to the present embodiment, the diameter of the main body portion 62 is larger than that of the attachment portion 61 so that the door of the lavatory can be easily locked by an arm, elbow or the like.

In addition, so as not to be mistaken for a door handle and gripped, the tip of the main body portion 62 has a small diameter and a trapezoidal cross section. However, the shape of the lock knob attachment 60 is not necessarily limited to such a shape.

Second Embodiment

Figure 13:
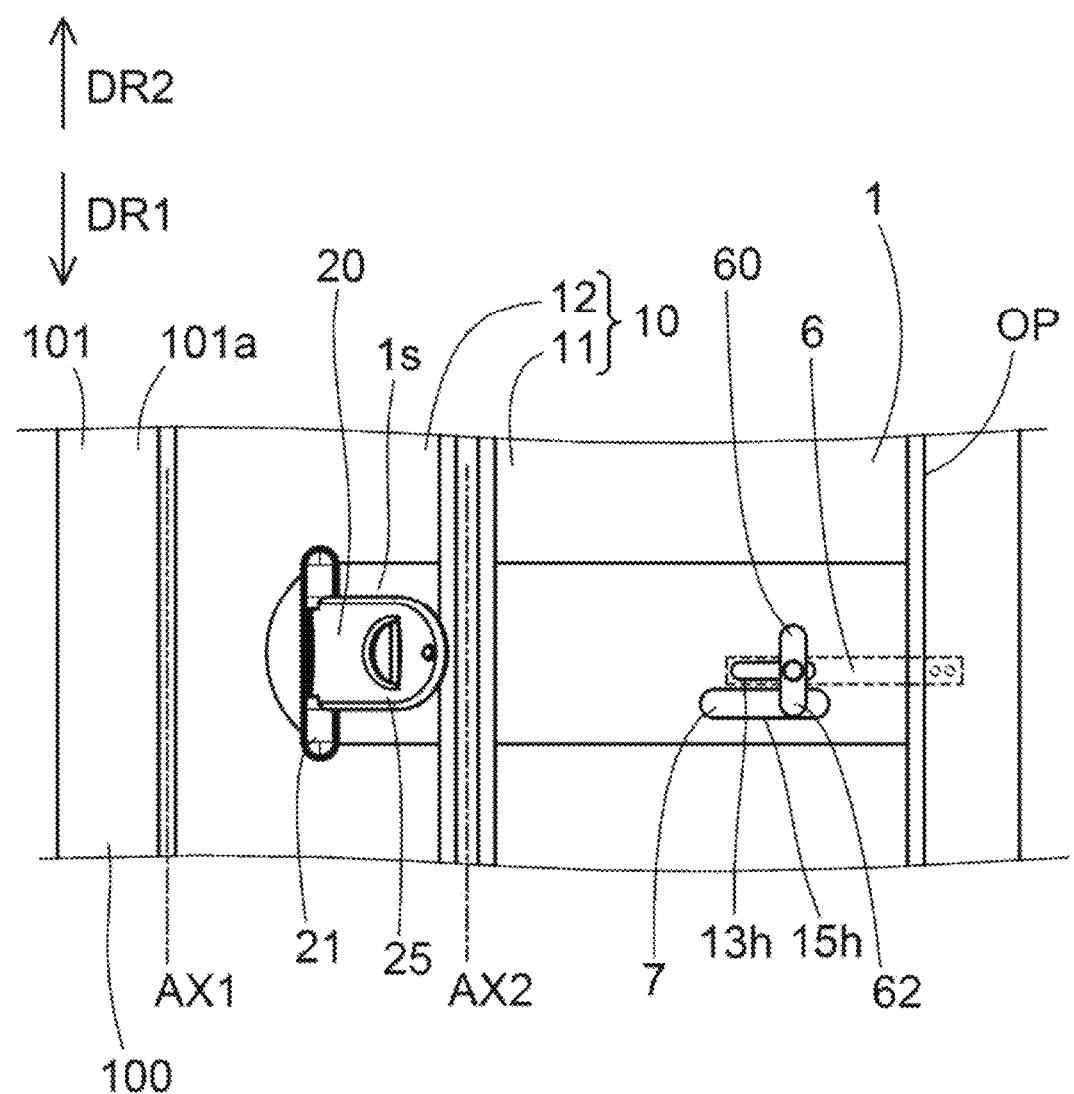
FIG. 13 is a schematic front view schematically illustrating a lavatory door according to the second embodiment.
Figure 14:
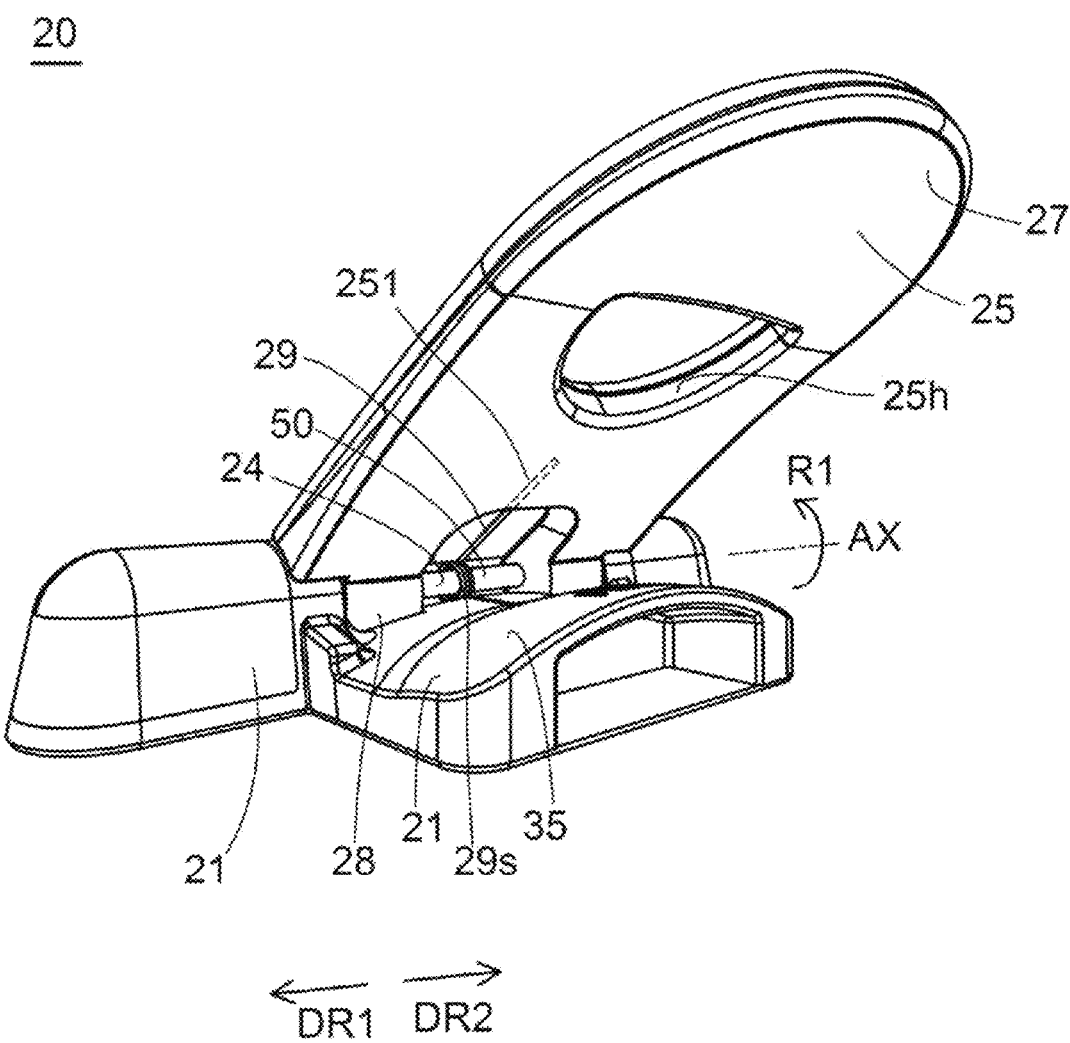
FIG. 14 is a schematic perspective view schematically illustrating a handle attachment according to the second embodiment.
Figure 15:
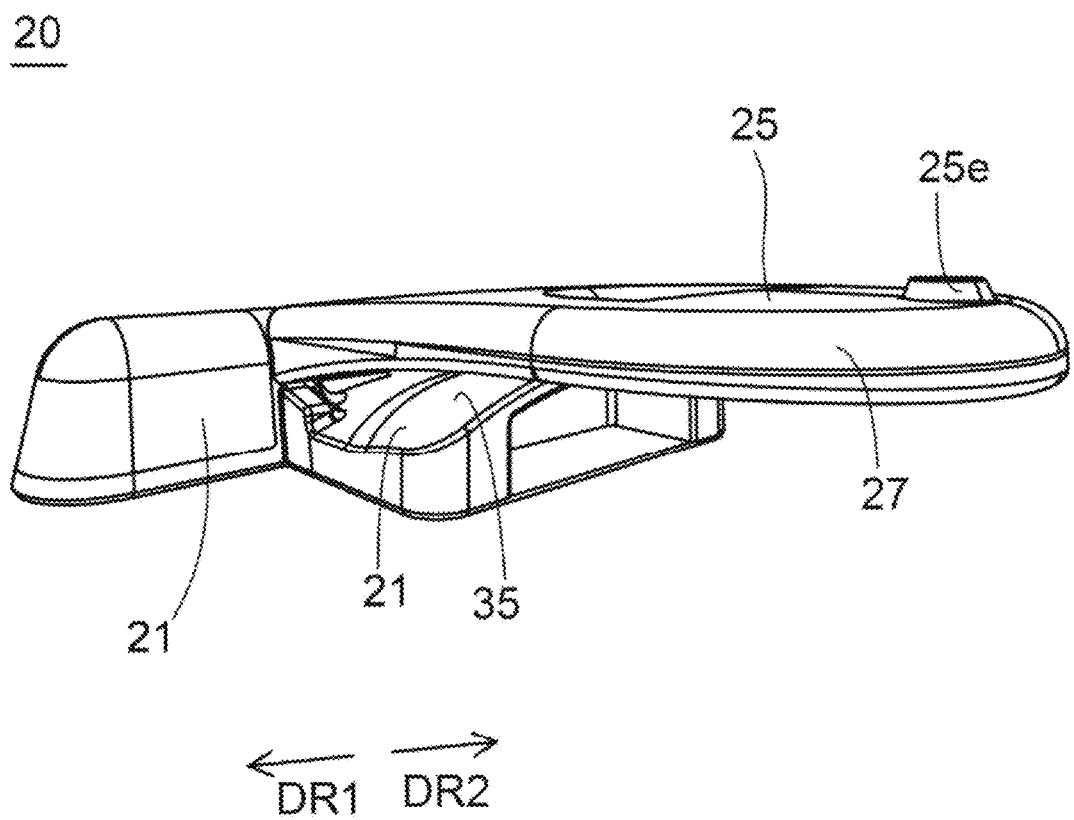
FIG. 15 is a schematic perspective view schematically illustrating the handle attachment according to the second embodiment.
Figure 16:
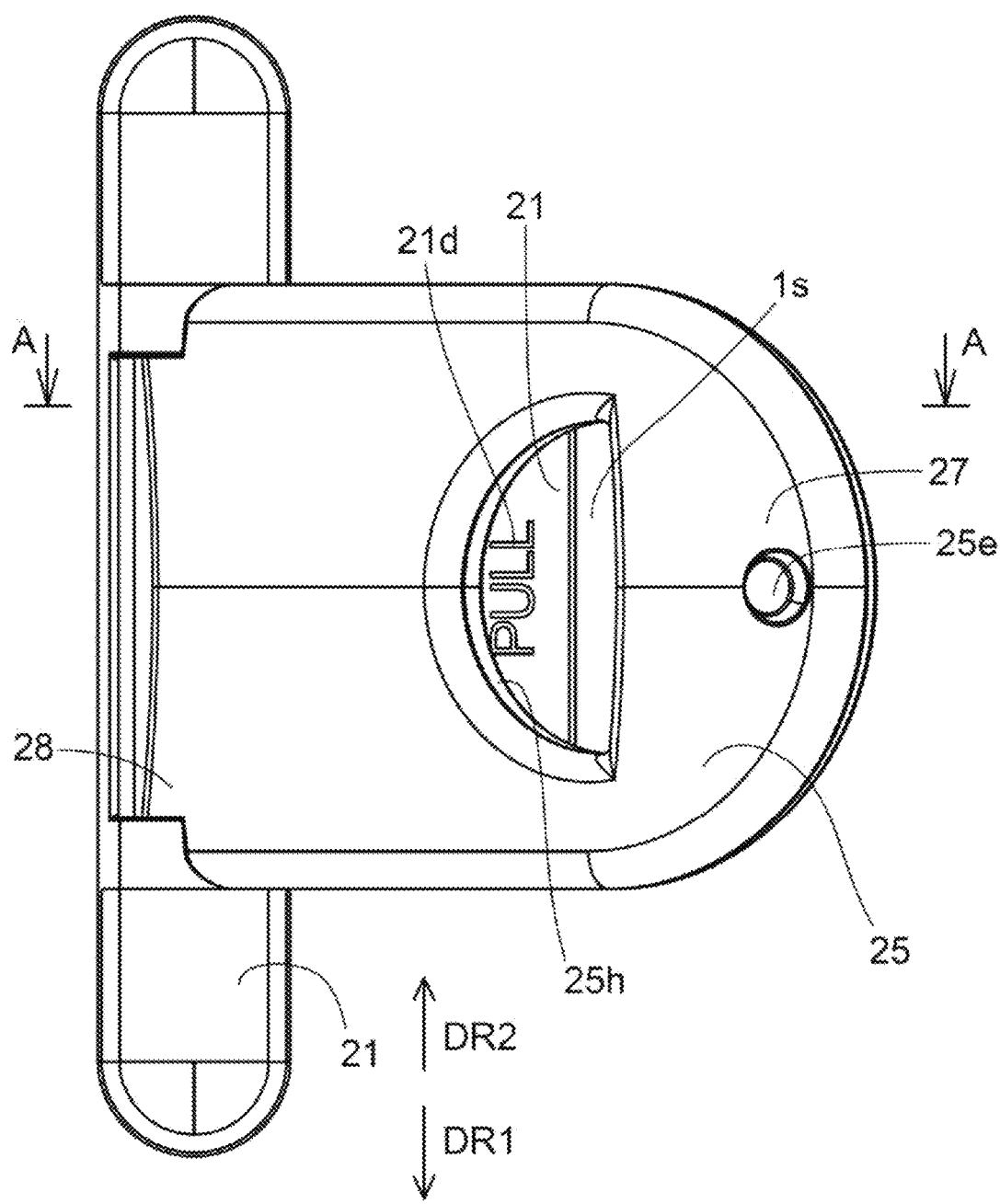
FIG. 16 is a schematic front view schematically illustrating the handle attachment according to the second embodiment.
Figure 17:
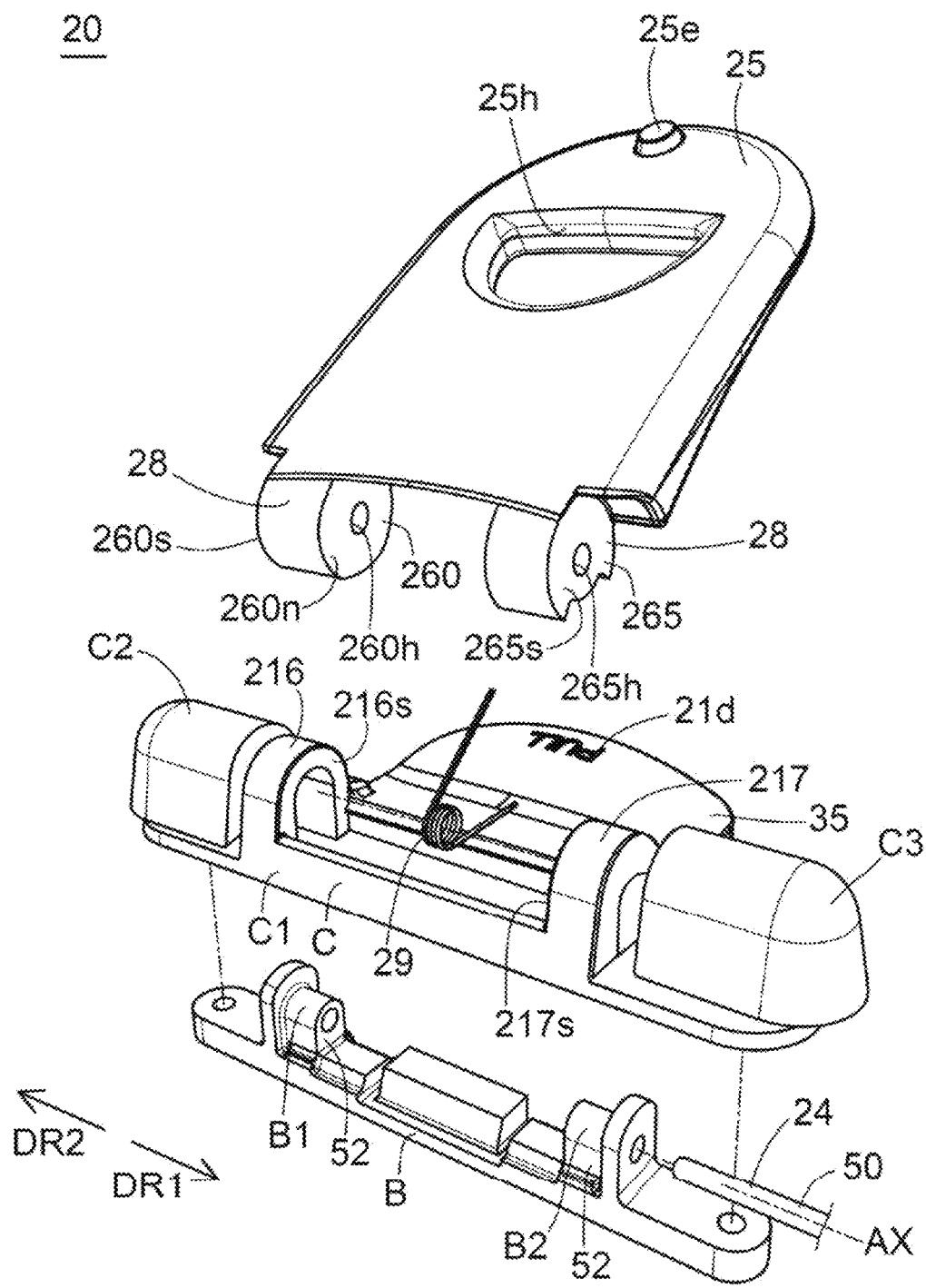
FIG. 17 is an exploded perspective view schematically illustrating the handle attachment according to the second embodiment.
Figure 18:
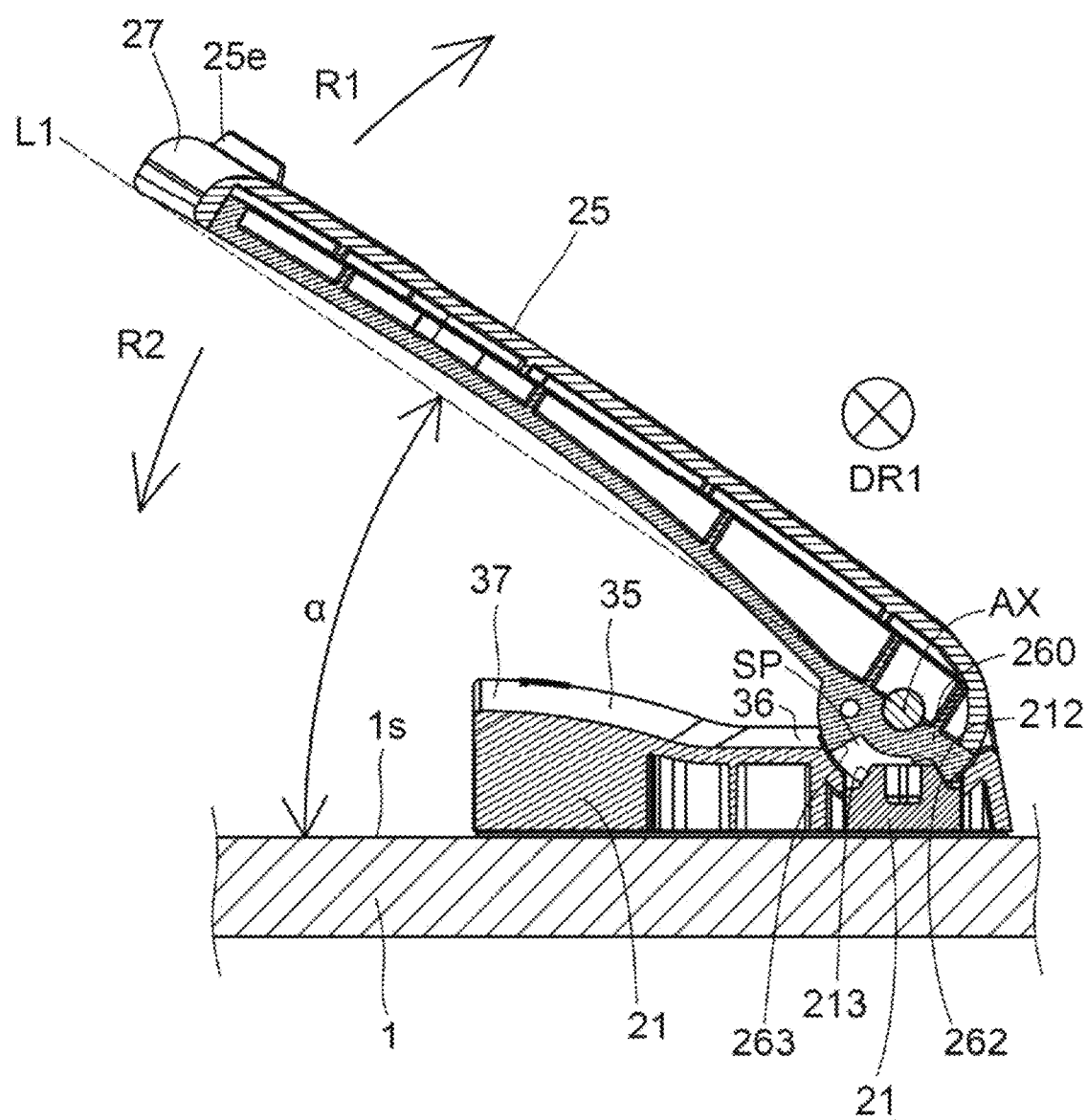
FIG. 18 is a cross-sectional view taken along the line A-A of FIG. 16.
Figure 19:
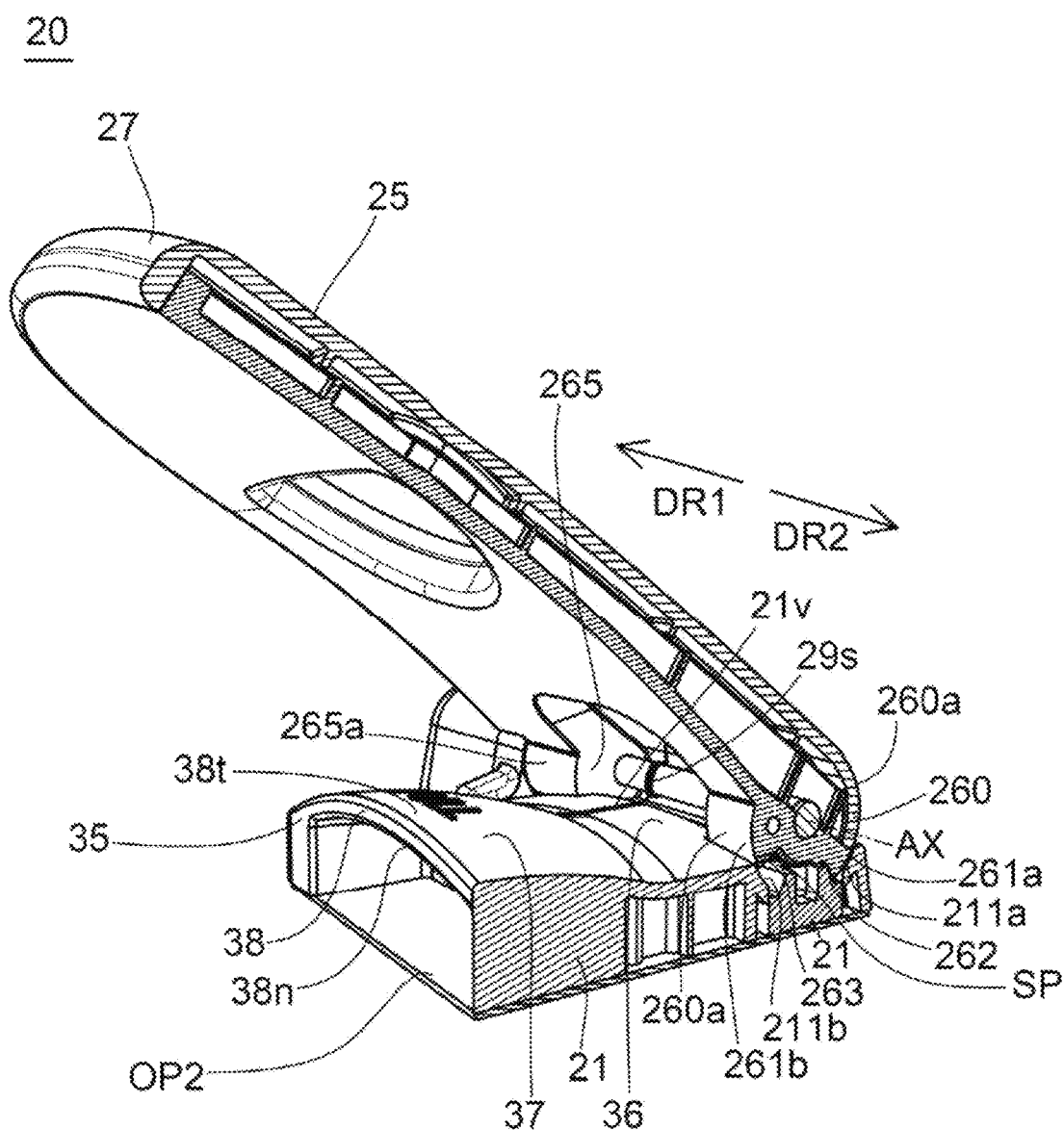
FIG. 19 is a schematic cross-sectional view schematically illustrating a handle attachment according to the second embodiment.
Figure 20:
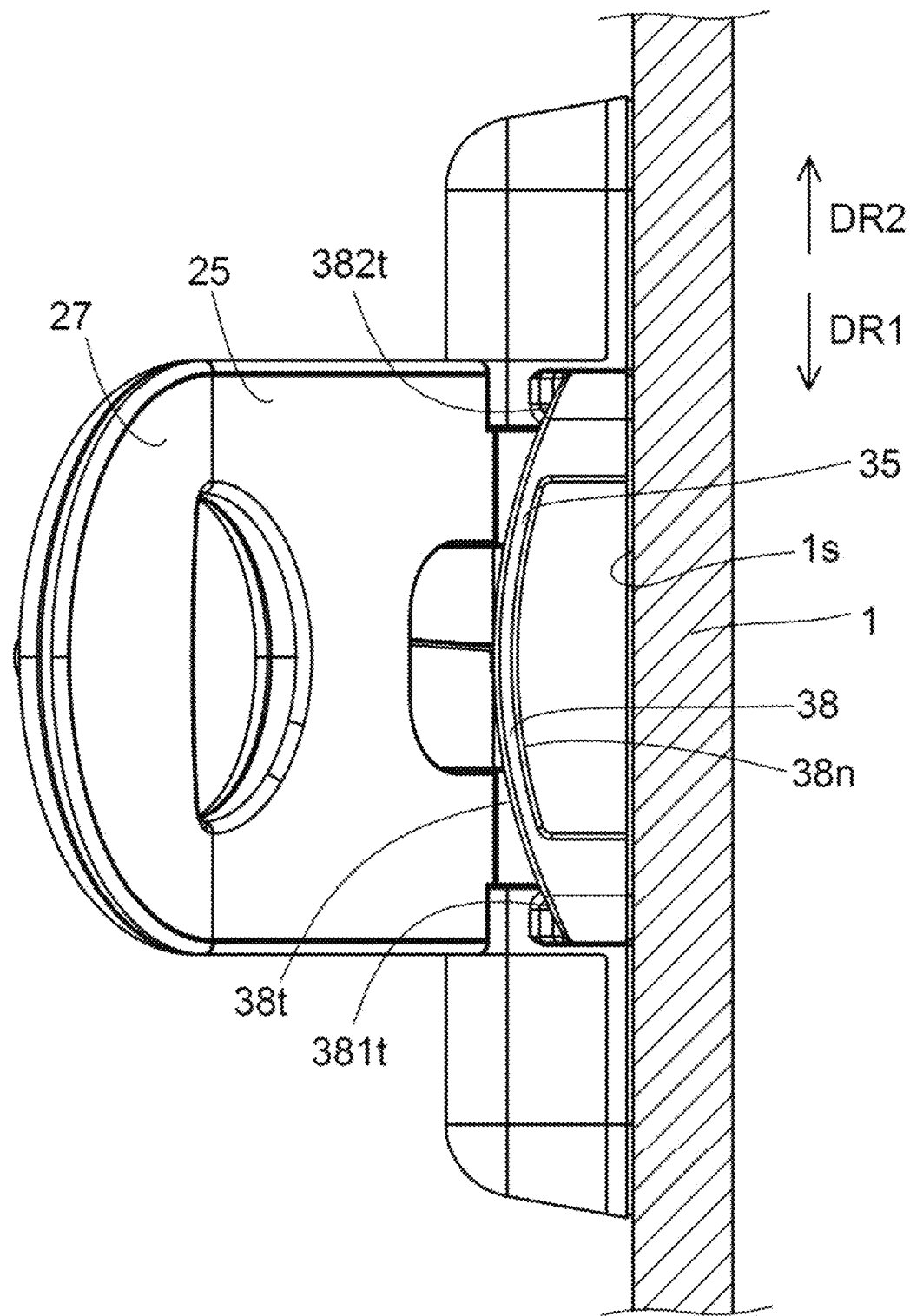
FIG. 20 is a schematic side view schematically illustrating a handle attachment according to the second embodiment.
Figure 21:
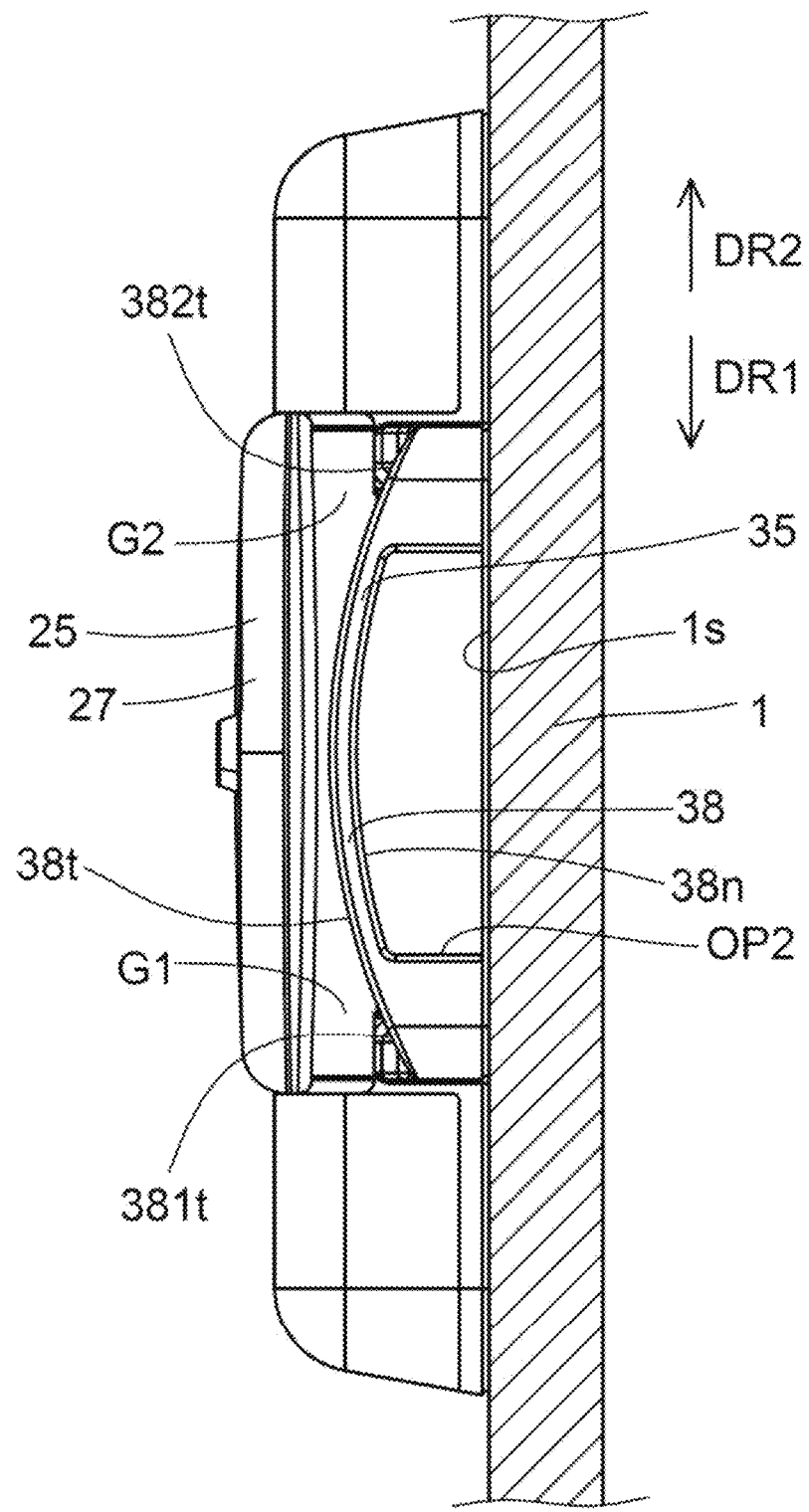
FIG. 21 is a schematic side view schematically illustrating a handle attachment according to the second embodiment.

Referring to FIG. 13 to FIG. 21, the handle attachment 20 and the lavatory door 1 according to the second embodiment will be described. FIG. 13 is a schematic front view schematically illustrating the lavatory door 1 according to the second embodiment. FIG. 14 and FIG. 15 are schematic perspective views schematically illustrating the handle attachment 20 according to the second embodiment. It should be noted that FIG. 14 is a view corresponding to a state in which the distal end portion 27 of the flap portion 25 is farthest from the wall surface of the door, and FIG. 15 is a view corresponding to a state where the distal end portion 27 of the flap portion 25 is closest to the wall surface of the door. FIG. 16 is a schematic front view schematically illustrating the handle attachment 20 according to the second embodiment. FIG. 17 is an exploded perspective view schematically illustrating the handle attachment 20 according to the second embodiment. FIG. 18 is a cross-sectional view taken along the line A-A of FIG. 16. FIG. 19 is a schematic cross-sectional view schematically illustrating the handle attachment 20 according to the second embodiment. FIG. 20 and FIG. 21 are schematic side views schematically illustrating the handle attachment 20 according to the second embodiment. FIG. 20 illustrates a state in which the distal end portion 27 of the flap portion 25 is farthest from the wall surface is of the door 1, and FIG. 21 illustrates a state in which the distal end portion 27 of the flap portion 25 is closest to the wall surface 1s of the door 1.

In the second embodiment, those points that differ from the first embodiment are primarily described, and redundant descriptions of the matters described in the first embodiment will be omitted. Accordingly, even if not explicitly described with respect to the second embodiment, it is needless to say that the matters described with respect to the first embodiment can be adopted in the second embodiment.

Lavatory Door 1

As illustrated in FIG. 13, the lavatory door 1 is attached to a wall 101 (more particularly, the wall of the lavatory unit of an aircraft). Door 1 opens and closes an opening portion OP defined by the wall 101.

In the example described in FIG. 13, the door 1 includes a door panel 10 and a handle attachment 20 that is attached to the door panel 10. The door 1 may include a lock bar 6 and a lock knob attachment 60 that is attached to the lock bar 6.

The door panel 10 is rotatably attached to the first wall 101a of the lavatory 100 around the door hinge axis AX1. The door panel 10 may be formed of one panel or a plurality of panels including a first panel 11 and a second panel 12.

In the example illustrated in FIG. 13, the first panel 11 and the second panel 12 are connected so as to be relatively rotatable around the second door hinge axis AX2. In other words, the door 1 in FIG. 13 is a bifold door.

In the example illustrated in FIG. 13, the door panel 10 (more particularly, the first panel 11) has an elongated hole portion 13h in which the attachment portion 61 of the lock knob attachment 60 can be slidably moved. The main body portion 62 of the lock knob attachment 60 is arranged on the front side of the elongated hole portion 13h, and the lock bar 6 is arranged on the back side of the elongated hole portion 13h.

The lock knob attachment 60 may be the lock knob attachment according to the first embodiment, or may be a lock knob attachment different from the lock knob attachment according to the first embodiment.

In the example described in FIG. 13, the door panel 10 (more particularly, the first panel 11) has a second elongated hole portion 15h parallel to the elongated hole portion 13h. A lock state display portion 7 is arranged behind the second elongated hole portion 15h. The lock state display portion 7 selectively displays, on the outer surface of the lavatory, a first display indicating that the door 1 is in the locked state and a second display indicating that the door 1 is in the unlocked state.

Handle Attachment 20

The handle attachment 20 is a portion that is operated by a user when the door 1 is opened. In the example illustrated in FIG. 13, the handle attachment 20 is attached to the door panel 10 (more particularly, to the second panel 12).

In the example illustrated in FIG. 14, the handle attachment 20 includes a base portion 21, a flap portion 25, a flap rotation mechanism 24 (more particularly, a pin member 50), and a biasing member 29.

The base portion 21 is attached to a part of the wall surface is of the door 1 (in other words, attached to any part of the entire inner wall surface of the door 1). In the example illustrated in FIG. 13, the base portion 21 is attached to the door panel 10.

The flap portion 25 is pulled by the user to import a pulling force to the door 1 (more particularly, to the door panel 10) via the base portion 21. In other words, when the user pulls the flap portion 25, the state of the door 1 is switched from a closed state in which the opening portion OP of the wall 101 is closed to an open state in which the opening portion OP is open. The flap portion 25 functions as a first operation unit operated by the user.

In the example described in FIG. 14, the flap portion 25 has a base end portion 28 connected to a flap rotation mechanism 24 (more particularly, a pin member 50) and a distal end portion 27 arranged at a position separated from the flap rotation mechanism 24. The flap portion 25 preferably has a horizontally elongated shape in which the length in a direction perpendicular to the rotation axis AX of the flap portion 25 is longer than the length in the direction parallel to the rotation axis AX of the flap portion 25.

In the example illustrated in FIG. 14, the biasing member 29 biases the flap portion 25 with respect to the base portion 21 in a first rotational direction R1 around the rotation axis AX. The first rotation direction R1 is a direction in which the distal end portion 27 of the flap portion 25 separates from the wall surface of the door 1. In the example illustrated in FIG. 14, the biasing member 29 is a torsion coil spring 29s. In the example illustrated in FIG. 14, the pin member 50 is inserted into the coil portion of the torsion coil spring 29s. In addition, one end portion of the torsion coil spring 29s comes into contact with the base portion 21, and the other end portion of the torsion coil spring 29s comes into contact with the flap portion 25. From the viewpoint of safety, it is preferable that one end portion and/or the other end portion of the torsion coil spring 29s be accommodated in a groove or a hole. In the example illustrated in FIG. 19, one end portion of the torsion coil spring 29s is accommodated in a groove 21v of the base portion 21. In addition, in the example illustrated in FIG. 14, the other end portion of the torsion coil spring 29s is accommodated in a hole 251 of the flap portion 25.

In the example illustrated in FIG. 14, the distal end portion 27 of the flap portion 25 is biased in a direction away from the wall surface of the door 1. In this case, (1) a first effect of making it easy to insert an arm or an elbow between the distal end portion 27 and the wall surface of the door 1, and (2) a second effect of having the distal end portion 27 retract toward the wall surface side of the door 1 (see FIG. 15) when the distal end portion 27 is unintentionally hit by a part of the body or the wall of the lavatory are synergistically achieved. The first effect makes it possible to smoothly open the door 1 without touching the flap portion 25 with fingers or hands. In addition, the second effect prevents users from being injured and suppresses damage to the wall or the like.

Subsequently, with reference to FIG. 1 to FIG. 21, an optional additional configuration that can be adopted in the second embodiment or the first embodiment described above will be described.

Through-Hole Portion 25h

In the example illustrated in FIG. 14, the flap portion 25 has a through-hole portion 25h on which a finger can be hooked. In this case, instead of operating the flap portion 25 by inserting an arm or elbow between the wall surface of the flap portion 25 and the door 1, it is possible to operate the flap portion 25 by hooking a finger on the through-hole portion 25h of the flap portion 25. Accordingly, it is possible to meet both the requests of users who wish to operate the flap portion 25 using their arm or elbow and the requests of users who wish to operate the flap portion 25 using their finger.

In addition, in the case that the flap portion 25 is provided with the through-hole portion 25h, users can intuitively recognize that the flap portion 25 is an operation unit to be operated by pulling, rather than an operation unit to be operated by pushing.

In the example illustrated in FIG. 16, the shape of the through-hole portion 25h is a non-circular shape (more particularly, a substantially semicircular shape). The through-hole portion 25h may have a substantially linear shape on the side of the flap portion 25 near the distal end portion 27, and a substantial arc shape on the side of the flap portion 25 near the base end portion 28. It should be noted that the shape of the through-hole portion 25h is not limited to the example illustrated in FIG. 16, and the shape of the through-hole portion 25h may be a circular shape. In addition, the through-hole portion 25h may be omitted.

Protruding Portion 25e

In the example illustrated in FIG. 16, the distal end portion 27 of the flap portion 25 is provided with a protruding portion 25e that protrudes in a direction away from the wall surface of the door 1. The protruding portion 25e is formed of an elastic material such as rubber (for example, polyurethane or the like). In this case, the protruding portion 25e functions as a buffer portion. When the flap portion 25 collides with a wall or a mirror or the like, the protruding portion 25e of the flap portion 25 collides with the wall or the mirror. Accordingly, when the protruding portion 25e is formed of an elastic material, the risk of damage to the wall, mirror, or flap portion 25 due to this collision is reduced. In addition, due to the presence of the protruding portion 25e, users may hesitate to press the distal end portion 27 of the flap portion 25 toward the wall surface of the door 1. In other words, the presence of the protruding portion 25e allows the user to intuitively recognize that the flap portion 25 is an operation unit to be operated by pulling, rather than an operation unit to be operated by pushing.

Second Operation Portion 35

In the example illustrated in FIG. 18, the handle attachment 20 includes a second operation portion 35. The second operation portion 35 is disposed between the wall surface is of the flap portion 25 and the door 1. In the example illustrated in FIG. 18, the second operation portion 35 is fixed to the door 1. In this case, the second operation portion 35 does not rotate about the rotation axis AX.

The second operation portion 35 is pulled by the user to impart a pulling force to the door (more particularly, to the door panel 10). In other words, when the user pulls the second operation portion 35, the state of the door 1 is switched from a closed state in which the opening portion OP of the wall 101 is closed to an open state in which the opening portion OP is open.

It is anticipated that there may be cases in which the flap portion 25 breaks, and use of the flap portion 25 becomes difficult. Even in this case, the user can easily open the door 1 by operating the second operation portion 35. As such, issues in which users become trapped in the lavatory (more particularly, the lavatory of an aircraft) are prevented. Further, in the example illustrated in FIG. 18, the second operation portion 35 is arranged between the flap portion 25 and the wall surface is of the door 1. Accordingly, users can easily recognize the presence of the second operation portion 35 that appears when the flap portion 25 is broken. It should be noted that, in a state before the flap portion 25 is broken, it is preferable that the second operation portion 35 is hidden behind the flap portion 25.

In the example illustrated in FIG. 17, a pulling instruction display 21d is provided on the surface of the base portion 21. In this case, when the flap portion 25 breaks and the second operation portion 35 appears, users can easily recognize the operation method (more particularly, a pulling operation) of the second operation portion 35. The pulling instruction display 21d may include characters indicating a pulling operation, such as "PULL," or a symbol indicating a pulling operation. In the example illustrated in FIG. 17, the pulling instruction display 21d is provided on the surface of the second operation portion 25.

In the example illustrated in FIG. 19, the second operation portion 35 has a first end portion 36 and a second end portion 37 that is farther from the rotation shaft AX compared to the first end portion 36. In addition, the second end portion 37 has an opening portion OP2 on which a finger can be hooked. In a case that the second end portion 37 has the opening portion OP2, the second operation portion 35 can be operated more easily. In the example illustrated in FIG. 19, the opening portion OP2 opens in a direction away from the rotation axis AX. Accordingly, the user can insert their finger from the opening portion OP2 into the inside of the second operation portion 35 by moving their finger in a direction toward the rotation axis AX.

In the example described in FIG. 19, the second operation portion 35 has a first wall portion 38 opposing the flap portion 25. In addition, when viewed in a direction from the second end portion 37 toward the first end portion 36, the outer surface 38t of the first wall portion 38 has a substantially arc shape protruding toward the flap portion 25. In this case, the risk of a finger being strongly pinched between the flap portion 25 and the second operation portion 35 is reduced. More particularly, in the example illustrated in FIG. 20, the outer surface 38t of the first wall portion 38 has a substantially arc shape in which the distance from the flap portion 25 increases from the central portion toward the edge portion 381t on the first direction DR1 side. Accordingly, as illustrated in FIG. 21, even when the flap portion 25 is closest to the second operation portion 35, there is a sufficient gap G1 between the flap portion 25 and the edge portion 381t to suppress finger pinching. Similarly, in the example illustrated in FIG. 21, the outer surface 38t of the first wall portion 38 has a substantially arc in which the distance from the flap portion 25 increases from the central portion toward the edge portion 382t on the second direction DR2 side. Accordingly, as illustrated in FIG. 21, even when the flap portion 25 is closest to the second operation portion 35, there is a sufficient gap G2 between the flap portion 25 and the edge portion 382t to suppress finger pinching.

In the example described in FIG. 19, when viewed in a direction from the second end portion 37 toward the first end portion 36, the inner surface 38n of the first wall portion 38 has a substantially arc shape protruding toward the flap portion 25. In this case, fingers can be easily inserted into the second operation portion 35 through the opening portion OP2. In addition, since the contact surface (38n) between the inserted fingers and the second operation portion 35 is arc shaped, the fit of the fingers with the second operation portion 35 is improved.

In the example illustrated in FIG. 21, in a state in which the flap portion 25 is closest to the second operation portion 35, the flap portion 25 is separated from the second operation portion 35 against the biasing force of the biasing member 29. Accordingly, even if the flap portion 25 rotates and moves toward the second operation portion 35 due to an impact force applied to the flap portion 25, the flap portion 25 does not collide with the second operation portion 35. In this way, damage to the second operation portion 35 is prevented. In addition, the risk of a finger being strongly pinched between the flap portion 25 and the second operation portion 35 is reduced.

In the example illustrated in FIG. 17, the flap rotation mechanism 24 includes a pin member 50. In addition, in the example illustrated in FIG. 17, the base end portion 28 of the flap portion 25 includes a first leg portion 260 having a first through-hole portion 260h into which the pin member 50 is inserted. Additionally, the base end portion 28 of the flap portion 25 may include a second leg portion 265 having a second through-hole portion 265h into which the pin member 50 is inserted. In this case, the flap portion 25 can be stably rotated around the rotation axis AX. It should be noted that the number of leg portions provided on the base end portion 28 of the flap portion 25 may be one, two, or three or more. In addition, the width of each leg portion (the length in the direction along the rotation axis AX) is appropriately set in consideration of the required strength and the like.

In the example illustrated in FIG. 19, within the outer peripheral surface of the first leg portion 260, a first exposed surface 260a (in other words, a surface not covered by the base portion 21) that is externally exposed is formed by a first arc surface centered on the rotation axis AX. Similarly, in the example illustrated in FIG. 19, within the outer peripheral surface of the second leg portion 265, a second exposed surface 265a (in other words, a surface not covered by the base portion 21) that is externally exposed is formed by a second arc surface centered on the rotation axis AX. In this case, it is possible to prevent a finger from being pinched between the first leg portion 260 (or the second leg portion 265) and the base portion 21 when the flap portion 25 rotates around the rotation shaft AX.

In the example illustrated in FIG. 18, the first leg portion 260 includes a first stopper 262 which can come into contact with the base portion 21, and a second stopper 263 that can come into contact with the base portion 21. The first stopper 262 defines a first rotation limit for when the flap portion 25 rotates in the first rotation direction R1, and the second stopper 263 defines a second rotation limit for when the flap portion 25 rotates in the second rotation direction R2 that is opposite to the first rotation direction R1.

In the example described in FIG. 18, the state in which the first stopper 262 is in contact with the first contact portion 212 of the base portion 21 corresponds to a state in which the distal end portion 27 of the flap portion 25 is farthest from the wall surface 1s of the door 1. In the state in which the distal end portion 27 of the flap portion 25 is farthest from the wall surface 1s of the door 1, the opening angle α of the flap portion 25 with respect to the wall surface 1s of the door 1 (more particularly, in a cross section perpendicular to the rotation axis AX, the angle formed between the straight line L1 that connects the rotation axis AX and the distal end portion 27 of the flap and the wall surface is of the door 1) is preferably greater than or equal to 25 degrees and less than or equal to 45 degrees, or greater than or equal to 30 degrees and less than or equal to 40 degrees, for example.

The state in which the second stopper 263 is in contact with the second contact portion 213 of the base portion 21 corresponds to a state in which the distal end portion 27 of the flap portion 25 is closest to the wall surface is of the door 1. In the state in which the distal end portion 27 of the flap portion 25 is closest to the wall surface 1s of the door 1, the opening angle of the flap portion 25 with respect to the wall surface is of the door 1 (more particularly, in a cross section perpendicular to the rotation axis AX, the angle formed between the straight line L1 that connects the rotation axis AX and the distal end portion 27 of the flap and the wall surface is of the door 1) is preferably greater than or equal to 1 degree and less than or equal to 8 degrees, greater than or equal to 1 degree and less than or equal to 6 degrees, or greater than or equal to 1 degree and less than or equal to 5 degrees.

In the example illustrated in FIG. 18, the base portion 21 and the flap portion 25 define a non-exposed region SP that cannot be externally accessed regardless of the position of the flap portion 25 between the first rotation limit and the second rotation limit. In addition, the first stopper 262 and the second stopper 263 are arranged in the non-exposed region SP. It should be noted that in the example illustrated in FIG. 18, the non-exposed region SP is a closed region surrounded by the base portion 21 and the first leg portion 260. As illustrated in FIG. 17, it is preferable that the first stopper 262 and the second stopper 263 are not exposed on the inner side surface 260n of the first leg portion 260 (in other words, are hidden by the inner side surface 260n).

In the case that the first stopper 262 and the second stopper 263 are disposed in the non-exposed area SP that cannot be externally accessed, it is possible to prevent fingers from being pinched between the first leg portion 260 (or the second leg portion 265) and the base portion 21 when the flap portion 25 rotates around the rotation shaft AX.

In the example illustrated in FIG. 19, the first leg portion 260 includes a first arc portion 261a disposed on one side of the rotation axis AX and a second arc portion 261b disposed on the other side of the rotation axis AX. In addition, the base portion 21 includes a third arc portion 211a that is always opposed to the first arc portion 261a and a fourth arc portion 211b that is always opposed to the second arc portion 261b.

In the example illustrated in FIG. 17, the base portion 21 includes a first cover portion 216 and a second cover portion 217. The first cover portion 216 covers the first outer side surface 260s of the first leg portion 260 on the second direction DR2 side, and the second cover portion 217 covers the second outer side surface 265s of the second leg portion 265 on the first direction DR1 side. In addition, in the example illustrated in FIG. 17, the first opposing surface of the first cover portion 216 that opposes the first outer side surface 260s is formed by the first arc surface 216s. In addition, the second opposing surface of the second cover portion 217 that opposes the second outer side surface 265s is formed by the second arc surface 217s.

The first outer side surface 260s of the first leg portion 260 (or the second outer side surface 265s of the second leg portion 265) is covered by the first cover portion 216 (or the second cover portion 217), thereby preventing fingers from being pinched between the first leg portion 260 (or the second leg portion 265) and the base portion 21 when the flap portion 25 rotates about the rotation axis AX.

In the example illustrated in FIG. 17, the base portion 21 includes a base member B and a cover member C. The base member B includes a first support portion B1 (in other words, a pin receiving portion 52) for rotatably supporting the pin member 50 and a second support portion B2 for rotatably supporting the pin member 50 (in other words, a pin receiving portion 52). It is preferable that the first support portion B1 and the second support portion B2 are each formed with a through-hole portion into which the pin member 50 can be inserted. In addition, the first support portion B1 and the second support portion B2 are preferably made of metal. In this case, even when the first support portion B1 and the second support portion B2 repeatedly receive loads from the pin member 50, the first support portion B1 and the second support portion B2 are unlikely to be damaged. The entire base member B may be made of metal. In addition, the pin member 50 may be made of metal. In this case, the pin member 50 is also unlikely to be damaged. However, in embodiments, it is not excluded that at least one or all of the first support portion B1, the second support portion B2, and the pin member 50 are made of resin.

The cover member C covers the first support portion B1 and the second support portion B2. The cover member C may include the above-described second operation portion 35. The cover member C may be made of resin, for example. In this case, it is easy to mold the cover member C into a complicated shape. However, in embodiments, it is not excluded that the cover member C is made of metal. In addition, the cover member C may be omitted. For example, the cover member C may be omitted by integrally molding the portion corresponding to the cover member C and the portion corresponding to the base member B. In this case, the entire base portion 21 may be made of metal or resin.

In the example illustrated in FIG. 17, end covers C2 and C3 are arranged at both ends of the cover member C. The end covers C2 and C3 hide a fastening member (not illustrated in FIG. 17) that fixes the base member B to the door panel 10 so that the user cannot see it. It is preferable that the end covers C2 and C3 be removable from the main body portion C1 of the cover member C. After the pin member 50 is arranged on the first support portion B1 and the second support portion B2, the end covers C2 and C3 may be attached to the main body portion C1.

The present invention is not limited to the above embodiments or modifications, and it is clear that the embodiments or modifications can be appropriately re-configured or modified within the scope of the technical idea of the present invention. In addition, any component used in each embodiment or each modification can be combined with other embodiments or other modifications, and any component can be omitted in each embodiment or modification.

It should be noted that the descriptions of numerical values for angles and the like in this specification are merely examples. Accordingly, it is needless to say that the description of the numerical values in the present specification does not limit the scope of claims.

This application claims priority to Japanese Patent Application No. 2020-95239, filed Jun. 1, 2020, the disclosure of which is incorporated herein by reference in its entirety.

REFERENCE LIST

1 . . . Door, 1s . . . Wall surface, 2 . . . Door hinge axis, 3 . . . Handle portion, 4 . . . Center-folding portion, 5 . . . Lock knob, 6 . . . Lock bar, 7 . . . Lock state display portion, 10 . . . Door panel, 11 . . . First panel, 12 . . . Second panel, 13h . . . Elongated hole portion, 15h . . . Second elongated hole portion, 20 . . . Handle attachment, 21 . . . Base portion, 21d . . . Pulling instruction display, 21v . . . Groove, 22 . . . Door wall surface side, 23 . . . Opposite side, 24 . . . Flap rotation mechanism, 25 . . . Flap portion, 25e . . . Protruding portion, 25h . . . Through-hole portion, 26 . . . Auxiliary base portion, 27 . . . Distal end portion, 28 . . . Base end portion, 29 . . . Biasing member, 29s . . . Torsion coil spring, 35 . . . Second operation portion, 36 . . . First end portion, 37 . . . Second end portion, 38 . . . First wall portion, 38n . . . Inner surface, 38t . . . Outer surface, 50 . . . Pin member, 51 . . . Pin receiving portion, 52 . . . Pin receiving portion, 60 . . . Lock knob attachment, 61 . . . Attachment portion, 62 . . . Main body portion, 100 . . . Lavatory, 101 . . . Wall, 101a . . . First wall, 211a . . . Third arc portion, 211b . . . Fourth arc portion, 212 . . . First contact portion, 213 . . . Second contact portion, 216 . . . First cover portion, 216s . . . First arc surface, 217 . . . Second cover portion, 217s . . . Second arc surface, 251 . . . Hole, 260 . . . First leg portion, 260a . . . First exposed surface, 260h . . . First through-hole portion, 260n . . . Inner side surface, 260s . . . Outer side surface, 261a . . . First arc portion, 261b . . . Second arc portion, 262 . . . First stopper, 263 . . . Second stopper, 265 . . . Second leg portion, 265a . . . Second exposed surface, 265h . . . Second through-hole portion, 265s . . . Outer side surface, 381t . . . Edge portion, 382t . . . Edge portion, B . . . Base member, B1 . . . First support portion, B2 . . . Second support portion, C . . . Cover member, C1 . . . Main body portion, C2, C3 . . . End cover, OP . . . Opening portion, OP2 . . . Opening portion

The invention claimed is:

1. A handle attachment comprising:
  a base portion that can be attached to a portion of a wall surface of a door;
  a flap portion that applies, as a result of a pulling operation, a pulling force to the door via the base portion;
  a flap rotation mechanism that rotatably connects the flap portion with respect to the base portion around a rotation axis; and
  a biasing member that biases the flap portion in a first rotation direction around the rotation axis with respect to the base portion,
  wherein:
    the flap portion includes a base end portion connected to the flap rotation mechanism and a distal end portion arranged at a position away from the flap rotation mechanism;
    the first rotation direction is a direction in which the distal end portion of the flap portion separates from the wall surface of the door;
    the flap rotation mechanism includes a pin member that extends along a first direction;
    the base end portion of the flap portion includes a first leg portion having a first through-hole portion into which the pin member is inserted;

the first leg portion includes a first stopper that can come into contact with the base portion and a second stopper that can come into contact with the base portion;

the first stopper defines a first rotation limit for when the flap portion rotates in the first rotation direction;

the second stopper defines a second rotation limit for when the flap portion rotates in a second rotation direction that is opposite to the first rotation direction;

the base portion and the flap portion define a non-exposed region that cannot be externally accessed; and the first stopper and the second stopper are arranged in the non-exposed region.

2. The handle attachment according to claim 1, wherein the flap portion has a through-hole portion on which a finger can be hooked.

3. The handle attachment according to claim 1, wherein:
the distal end portion of the flap portion is provided with a protruding portion that protrudes in a direction away from the wall surface of the door; and
the protruding portion is formed of an elastic material.

4. The handle attachment according to claim 1, further comprising:
a second operation portion arranged between the flap portion and the wall surface of the door.

5. The handle attachment according to claim 4, wherein:
the second operation portion includes a first end portion and a second end portion that is farther from the rotation axis compared to the first end portion; and
the second end portion includes an opening portion on which a finger can be hooked.

6. The handle attachment according to claim 5, wherein:
the second operation portion has a first wall portion that opposes the flap portion; and when viewed in a direction from the second end portion toward the first end portion, an outer surface of the first wall portion has a substantially arc-shape protruding toward the flap portion.

7. The handle attachment according to claim 4, wherein:
a pulling instruction display is provided on a surface of the base portion.

8. The handle attachment according to claim 4, wherein:
when the flap portion is closest to the second operation portion, the flap portion separates from the second operation portion against a biasing force of the biasing member.

9. The handle attachment according to claim 1, wherein:
within an outer peripheral surface of the first leg portion, a first exposed surface that is externally exposed is formed by a first arc surface centered on the rotation axis.

10. The handle attachment according to claim 9, wherein:
the base portion includes a first cover portion that covers a first outer side surface of the first leg portion; and
within the first cover portion, a first opposing surface that opposes the first outer side surface is formed by a first arc surface.

11. The handle attachment according to claim 1, wherein:
the base portion includes:
a base member having a metal first support portion that rotatably supports the pin member and a metal second support portion that rotatably supports the pin member; and
a resin cover member that covers the first support portion and the second support portion.

12. A lavatory door comprising:
the handle attachment according to claim 1; and
a door panel attached to a first wall of a lavatory so as to be rotatable around a door hinge axis,
wherein:
the handle attachment is attached to the door panel.

* * * * *